US006947556B1

(12) United States Patent
Matyas, Jr. et al.

(10) Patent No.: US 6,947,556 B1
(45) Date of Patent: Sep. 20, 2005

(54) SECURE DATA STORAGE AND RETRIEVAL WITH KEY MANAGEMENT AND USER AUTHENTICATION

(75) Inventors: Stephen Michael Matyas, Jr., Manassas, VA (US); Mohammad Peyravian, Morrisville, NC (US); Allen Leonid Roginsky, Durham, NC (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 09/642,879

(22) Filed: Aug. 21, 2000

(51) Int. Cl.[7] .............................................. H04L 9/08
(52) U.S. Cl. ........................... 380/29; 380/45; 380/44; 380/43; 380/281
(58) Field of Search ............................... 380/9, 21, 23, 380/25, 30, 49, 258, 281, 29, 43, 44, 45; 709/225; 713/155, 156, 171, 201

(56) References Cited

U.S. PATENT DOCUMENTS

| 4,238,854 | A | | 12/1980 | Ehrsam et al. ................. 375/2 |
| 4,757,533 | A | | 7/1988 | Allen et al. .................... 380/25 |
| 5,150,407 | A | | 9/1992 | Chan ............................. 380/4 |
| 5,235,641 | A | | 8/1993 | Nozawa et al. ............... 380/21 |
| 5,495,533 | A | | 2/1996 | Linehan et al. ............... 380/21 |
| 5,499,298 | A | * | 3/1996 | Narasimhalu et al. ........ 705/54 |
| 5,563,946 | A | | 10/1996 | Cooper et al. ................. 380/4 |
| 5,638,448 | A | | 6/1997 | Nguyen ........................ 380/29 |
| 5,699,428 | A | | 12/1997 | McDonnal et al. ............ 380/4 |
| 5,719,941 | A | | 2/1998 | Swift et al. ................... 380/25 |
| 5,734,819 | A | | 3/1998 | Lewis .......................... 395/186 |
| 5,751,814 | A | | 5/1998 | Kafri ............................ 380/49 |
| 5,787,169 | A | | 7/1998 | Eldridge et al. ............... 380/4 |
| 5,805,712 | A | | 9/1998 | Davis ........................... 380/50 |
| 5,841,871 | A | | 11/1998 | Pinkas ......................... 380/25 |
| 5,995,624 | A | | 11/1999 | Fielder et al. ................. 380/25 |
| 6,011,847 | A | | 1/2000 | Follendore, III ............... 380/4 |
| 6,023,506 | A | | 2/2000 | Ote et al. ...................... 380/4 |
| 6,105,131 | A | * | 8/2000 | Carroll ......................... 713/155 |
| 6,678,731 | B1 | * | 1/2004 | Howard et al. ............. 709/225 |

OTHER PUBLICATIONS

Konheim, Allen G. "*Cryptography, A Primer*," pp. 348-363 (1981).
Steiner et al. *Kerberos: An Authentication Service For Open Network Systems*, Jan. 12, 1988.
Schneier, Bruce, *Applied Cryptography*: Protocols, Algorithms, and Source Code in C, pp. 51-55 and 417-425 (Dec. 1995).

\* cited by examiner

*Primary Examiner*—Gregory Morse
*Assistant Examiner*—Ellen C Tran
(74) *Attorney, Agent, or Firm*—Myers Bigel Sibley & Sajovec

(57) ABSTRACT

Methods, systems and computer program products are provided which provide for controlling access to digital data in a file by encrypting the data with a first key, encrypting the first key with a second personal key generated from a password/passphrase associated with the file and further encrypting the encrypted first key with a control key which is managed by the system. In certain embodiments, user authentication may also be provided by issuing a ticket which is utilized to create, access and administer the files in the system.

66 Claims, 19 Drawing Sheets

SECURE DATA STORAGE AND RETRIEVAL WITH KEY MANAGEMENT AND USER AUTHENTICATION

RELATED APPLICATIONS

The present application is related to U.S. patent application Ser. No. 09/642,878, entitled "SECURE DATA STORAGE AND RETRIEVAL IN A CLIENT-SERVER ENVIRONMENT", the disclosure of which is incorporated by reference as if set forth fully herein.

FIELD OF THE INVENTION

The present invention relates to data processing systems and more particularly to the security of stored digital data.

BACKGROUND OF THE INVENTION

With an ever increasing awareness among the public as to the privacy of digitally stored data, much attention has been focused on mechanisms for providing secure files and/or file access. Such security may become ever more important as, for example, more and more information is stored in a "file server" format. For example, with the recent introduction of publicly accessible "Internet hard disks" where files of many different, and often unrelated, users are stored on Internet accessible servers, the issue of file security may become even more important. As is evidenced by, for example, the systems identified below, many differing solutions have been proposed to the problem of file security.

One conventional file security system is described in Allen G. Konheim, *Cryptography, A Primer*, John Wiley & Sons, New York, 1981, pp. 348–363, which describes a file security system called the Information Protection System (IPS). In IPS, each user has a secret passphrase, which is hashed by the system to produce a file encryption key. The file encryption key is then used to encrypt/decrypt that user's files. The encrypted files for all users are stored in a common system database. Each enciphered file has a file header. The file header contains such information as the type of encipherment used, a time-date stamp, the version of IPS employed, cryptographic chaining information and a key verification field, but it contains no encrypted key field, since IPS uses only a 1-level key management system.

Additional security systems are described in U.S. Pat. Nos. 4,238,854, 4,757,533, 5,150,407, 5,235,641, 5,495, 533, 5,563,946, 5,699,428, 5,719,941, 5,751,814, 5,787,169, 5,841,871, 6,011,847 and 6,023,506.

SUMMARY OF THE INVENTION

Embodiments of the present invention include methods, systems and computer program products which provide for controlling access to digital data in a file by encrypting the data with a first key, encrypting the first key with a second personal key generated from a password/passphrase associated with the file and further encrypting the encrypted first key with a control key which is managed by the system. In certain embodiments, user authentication may also be provided by issuing a ticket which is utilized to create, access and administer the files in the system.

In particular embodiments, the file system may include a file server, a personal key server and a personal key client. The file server is configured to store an encrypted file and a file header corresponding to the digital data of the file and containing an encryption key encrypted with both a personal key of an owner of the file and a control key. The personal key server is configured to receive a header associated with a file, the file header containing an encryption key encrypted with a personal key and encrypt encrypted encryption key with a control key to provide the file header containing an encryption key encrypted with both a personal key and a control key. The personal key client is configured to generate the encryption key, encrypt the digital data of the file with the encryption key, generate the personal key from a password associated with the file, encrypt the encryption key with the personal key, incorporate the encrypted encryption key in a file header associated with the file and provide the file header with the encryption key encrypted with the personal key to the personal key server, receive the file header from the personal key server and provide the file header received from the personal key server to the file server.

In further embodiments of the present invention, an authentication server may also be provided. The authentication server may be configured to receive access requests from the personal key client, determine if the access request is authorized and provide a ticket to the personal key client if the access request is authorized. In such embodiments, the personal key client may be further configured to request access from the authentication server, receive the ticket from the authentication server and provide the ticket along with the file header to the personal key server and along with the encrypted file and the file header to the file server. Furthermore, the personal key server may be further configured to receive the ticket from the personal key client, determine the validity of the ticket and reject requests from the personal key client if the ticket is invalid. Finally, the file server may be further configured to receive the ticket from the personal key client, determine the validity of the ticket and reject requests from the personal key client if the ticket is invalid.

In still further embodiments of the present invention, the file may be accessed by the personal key client receiving a request to access the file by the file owner. The personal key client requests the file and the associated file header from the file server, extracts the encryption key encrypted with the personal key and the control key from the file header and requests that the personal key server recover the encrypted encryption key from the file header. The recovered encrypted encryption key is received from the personal key server. The personal key client generates the personal key from the password, decrypts the recovered encrypted encryption key with the personal key to recover the encryption key and decrypts the encrypted digital data with the recovered encryption key. The file server provides the file and the associated file header to the personal key client in response to the request for the file and the associated file header. The personal key server receives a request from the personal key client to recover the encrypted encryption key containing the encryption key encrypted with the personal key and the control key, decrypts the encryption key encrypted with the personal key and the control key with the control key and returns the encryption key encrypted with the personal key to the personal key client.

In still further embodiments of the present invention, the password associated with the file may be changed by the personal key client requesting the file header associated with the file from the file server, receiving the file header from the file server, extracting the encryption key encrypted with the personal key and the control key and requesting that the personal key server recover the encrypted encryption key. The personal key client receives the recovered encrypted encryption key from the personal key server, generates the personal key and decrypts the recovered encrypted encryption key with the personal key to provide a recovered encryption key. The personal key client also obtains a new password associated with the file, generates a new personal key based on the new password, encrypts the recovered encryption key to provide a new personal key encrypted encryption key and requests an update of the file header by the personal key server to incorporate the new personal key encrypted encryption key. In response, the personal key client receives an updated file header from the personal key server and provides the updated file header to the file server.

The file server receives the request for the file header from the personal key client and provide the file header to the personal key client. The file server also receives the updated file header from the personal key client and stores the received file header.

The personal key server receives the request to recover the encrypted file encryption key and decrypts the file encryption key encrypted with the personal key and the control key to provide the recovered encrypted encryption key. The personal key server then provides the recovered encrypted encryption key to the personal key client. The personal key server also receives the request to update the file header to incorporate the new personal key encrypted encryption key, encrypts the new personal key encrypted encryption key with the control key, incorporates the encryption key encrypted with the new personal key and the control key in the file header to provide an updated file header and returns the updated file header to the personal key client.

In further embodiments, the personal key client may include in the request to update of the file header by the personal key server to incorporate an identification of a user requesting to update the file header. In such embodiments, the personal key server may compare the identification of the user requesting to update the file header with the list of users authorized to access the file and reject the request if the user requesting to update the file header is not identified in the list of users authorized to access the file as the owner of the file.

In additional embodiments of the present invention, access by a trusted third party may be provided by the personal key client encrypting the encryption key with a public key of a trusted third party and incorporating the encryption key encrypted with the public key of a trusted third party into the file header. Furthermore, the personal key client may receive a request by the trusted third party to access the file and request access to the file by the trusted third party from the file server. The personal key client receives the encrypted file and the file header from the file server, extracts the encryption key encrypted with the public key of the trusted third party from the received file header, obtains the private key of the trusted third party, decrypts the extracted encryption key encrypted with the public key of the trusted third party to recover the encryption key and decrypts the encrypted file with the recovered encryption key. The file server receives the request for access to the file by the trusted third party and provides the encrypted file and the associated file header to the personal key client in response to receiving the request for access to the file by the trusted third party.

In yet further embodiments of the present invention, the public key of the trusted third party may be updated by the personal key client requesting the file header associated with the file from the file server, receiving the file header from the file server, extracting the encryption key encrypted with the personal key and the control key and requesting that the personal key server recover the encrypted encryption key.

The personal key client receives the recovered encrypted encryption key from the personal key server, generates the personal key, decrypts the recovered encrypted encryption key with the personal key, obtains a new public key associated with the trusted third party to provide a new public key encrypted encryption key, incorporates the new public key encryption key in the file header and provides the file header to the file server. The personal key server receives the request to recover the encrypted file encryption key, decrypts the file encryption key encrypted with the personal key and the control key to provide the recovered encrypted encryption key and provides the recovered encrypted encryption key to the personal key client.

In yet further embodiments of the present invention, additional users may be given access to the file by the personal key client incorporating the encryption key unencrypted in the file header and providing the personal key server with a list of users authorized to have access to the file. The personal key server encrypts the unencrypted encryption key with the control key, incorporates the unencrypted encryption key encrypted with the control key in the file header and returns the file header incorporating the encryption key encrypted with the control key to the personal key client.

In such embodiments, the personal key client may be further configured to receive a request to access the file by a user other than the file owner, request the file and the associated file header from the file server, extract the encryption key encrypted with only the control key from the file header, request that the personal key server recover the encryption key from the file header, receive the recovered encryption key from the personal key server and decrypt the encrypted digital data with the recovered encryption key. The file server may be configured to provide the file and the associated file header in to the personal key client in response to the request for the file and the associated file header. The personal key server may be configured to receive a request from the personal key client to recover the encryption key in response to a request by a user other than the owner, the request from the personal key client containing the encryption key encrypted with the control key, decrypt the encryption key encrypted with the control key with the control key and return the encryption key to the personal key client.

Furthermore, the personal key client may include in the request to recover the encryption key an identification of the user requesting to access the file. In such a case, the personal key server compares the identification of the user requesting to access the file with the list of users authorized to access the file and rejects the request if the user requesting to access the file is not identified in the list of users authorized to access the file.

In yet another embodiment of the present invention, the personal key client encrypts the encryption key with a public key of each user other than the owner which is authorized to access the file to provide a public key encrypted encryption key corresponding to each user other than the owner. The personal key client incorporates the public key encrypted encryption key corresponding to each user other than the owner of the file in the file header and provides the personal key server with a list containing each user authorized to have access to the file. The personal key server encrypts each public key encrypted encryption key with the control key, incorporates each public key encrypted encryption key encrypted with the control key in the file header and returns the file header incorporating each public key encrypted encryption key encrypted with the control key to the personal key client.

To update the public key of a user other than the owner, the personal key client requests the file header associated with the file from the file server, receives the file header from the file server, extracts the encryption key encrypted with the personal key and the control key and requests that the personal key server recover the encrypted encryption key. The personal key client receives the recovered encrypted encryption key from the personal key server, generates the personal key and decrypts the recovered encrypted encryption key with the personal key to provide a recovered encryption key. The personal key client obtains a new public key associated with a user other than the owner of the file, encrypts the recovered encryption key with the new public key to provide a new public key encrypted encryption key and requests an update of the file header by the personal key server to incorporate the new public key encrypted encryption key. The personal key server receives an updated file header from the personal key server and provides the updated file header to the file server.

The personal key server receives the request to recover the encrypted file encryption key, decrypts the file encryption key encrypted with the personal key and the control key to provide the recovered encrypted encryption key and provides the recovered encrypted encryption key to the personal key client. The personal key server also receives the request to update the file header to incorporate the new public key encrypted encryption key, encrypts the new public key encrypted encryption key with the control key, incorporates the encryption key encrypted with the new public key and the control key in the file header to provide an updated file header and returns the updated file header to the personal key client.

The personal key client may also include in the request to update of the file header by the personal key server a new public key encrypted encryption key and an identification of a user requesting to update the file header. The personal key server compares the identification of the user requesting to update the file header with the list of users authorized to access the file and rejects the request if the user requesting to update the file header is not identified in the list of users authorized to access the file as the owner of the file.

In still further embodiments the other users may access the file by the personal key client receiveing a request from a user other than the owner to access the file. The personal key client requests the file and the associated file header from the file server, extracts the public key encrypted encryption key encrypted with the control key corresponding to the user requesting access to the file from the file header, requests that the personal key server recover the public key encrypted encryption key corresponding to the user requesting access to the file from the file header, receives the recovered public key encrypted encryption key from the personal key server. The personal key client obtains a private key associated with the user requesting access to the file, decrypts the recovered encrypted encryption key with the private key to recover the encryption key and decrypts the encrypted digital data with the recovered encryption key.

The personal key server receives a request from the personal key client to recover the public key encrypted encryption key containing the public key encrypted encryption key encrypted with the control key corresponding to the user requesting access to the file, decrypts the public key encrypted encryption key encrypted the control key with the control key and returns the public key encrypted encryption key corresponding to the user requesting the file to the personal key client.

In still further embodiments of the present invention, the personal key client is further includes in the request to recover the public key encrypted encryption key corresponding to the user requesting to access the file an identification of the user requesting to access the file. The personal key server compares the identification of the user requesting to access the file with the list of users authorized to access the file and rejects the request if the user requesting to access the file is not identified in the list of users authorized to access the file.

While the invention has been described above primarily with respect to the system aspects of the invention, both methods and/or computer program products are also provided. Furthermore, additional embodiments of the present invention may include, for example, personal key servers and personal key clients.

DETAILED DESCRIPTION OF PREFERRED EMBODIMENTS

Figure 1:
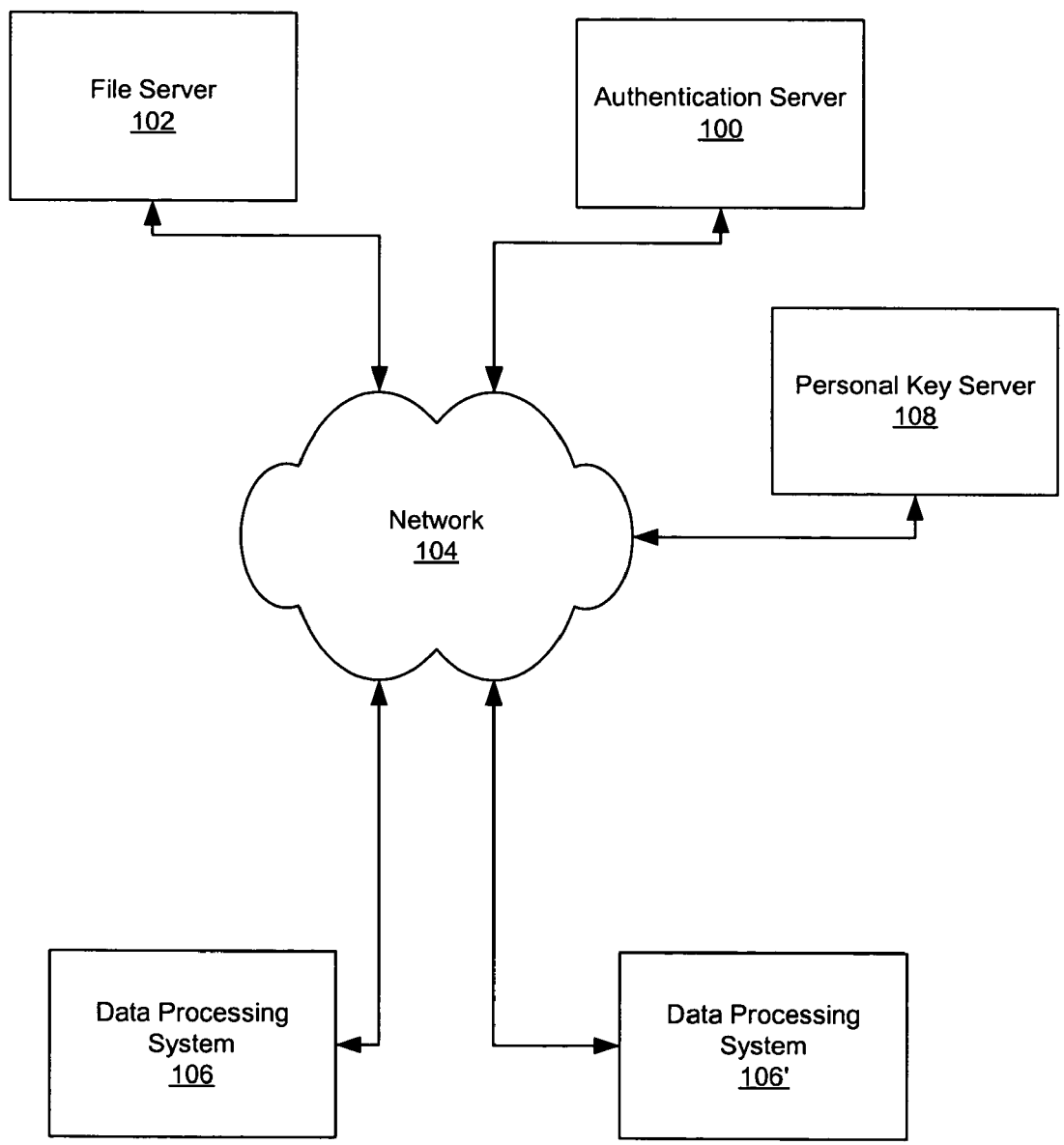
FIG. 1 is a block diagram of a system for encrypted file access according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention may provide for secure access to an encrypted file utilizing two-level encryption where a file is encrypted with a first key and where that key is encrypted with a second key generated from a password or passphrase associated with the file. As used herein, the terms password and passphrase are used interchangeably to refer to a value or sequence of values which may be provided by a user. The encrypted key may be further encrypted with a control key which may be managed by a key server to further control access to the file. The encrypted key may be stored in a header associated with the file and maintained on a server for access by a user. Additional embodiments of the present invention provide for storing, updating, retrieving and managing keys associated with users which have access to the file. Various embodiments of the present invention will now be described with reference to FIGS. 1 through 19.

Referring now to FIG. 1, a system for secure access to encrypted data according to embodiments of the present invention is illustrated. As seen in FIG. 1, a file server 102, which may store encrypted files and encrypted headers associated with the files, has access to a network 104. Similarly, an authentication server 100 and a personal key server 108 may also have access to the network 104. The network 104 may be an intranet, an extranet, a virtual private network, the Internet, a wireless network, a direct dial connection or even a "sneaker" network where information is transmitted from processing system to processing system utilizing a removable storage media. Whatever the method of communication, the network 104 serves to provide communication between the authentication server 100, the file server 102, the personal key server 108 and client data processing systems 106 and 106' which may access the encrypted files and headers on the file server 102. As used herein, the terms client data processing system and client may be used interchangeably.

While systems according to embodiments of the present invention are illustrated as having a separate authentication server 100, file server 102, personal key server 108 and client data processing systems 106 and 106', as will be appreciated by those of skill in the art, such functions may be integrated into a single data processing system or may be distributed across multiple data processing systems. Furthermore, multiple authentication servers 100, file servers 102 and/or personal key servers 108 may be accessed by a single or multiple client data processing systems 106 and 106. Additionally, while not illustrated in FIG. 1, multiple data processing systems may access one or more of the authentication server(2) 100, the file server(s) 102, and/or the personal key server(s) 108 through one or more client data processing systems 106 and 106'. Thus, the client data processing systems 106 and 106' may act as servers and provide files to other data processing systems. Such a system may be beneficial where the authentication server 100, the file server 102 and/or the personal key server 108 communicate with the client data processing systems 106 and 106' over an insecure network but where the other data processing systems may communicate with the client data processing systems 106 and 106' over a secure network, through a direct connection or through other such trusted communication media. In such a system, the client data processing systems 106 and 106' may act as a gateway between the trusted communication media and the insecure network. Thus, the present invention should not be construed as limited to the particular configuration illustrated in FIG. 1 but may be utilized with any configuration suitable for carrying out the operations described herein.

Figure 2:
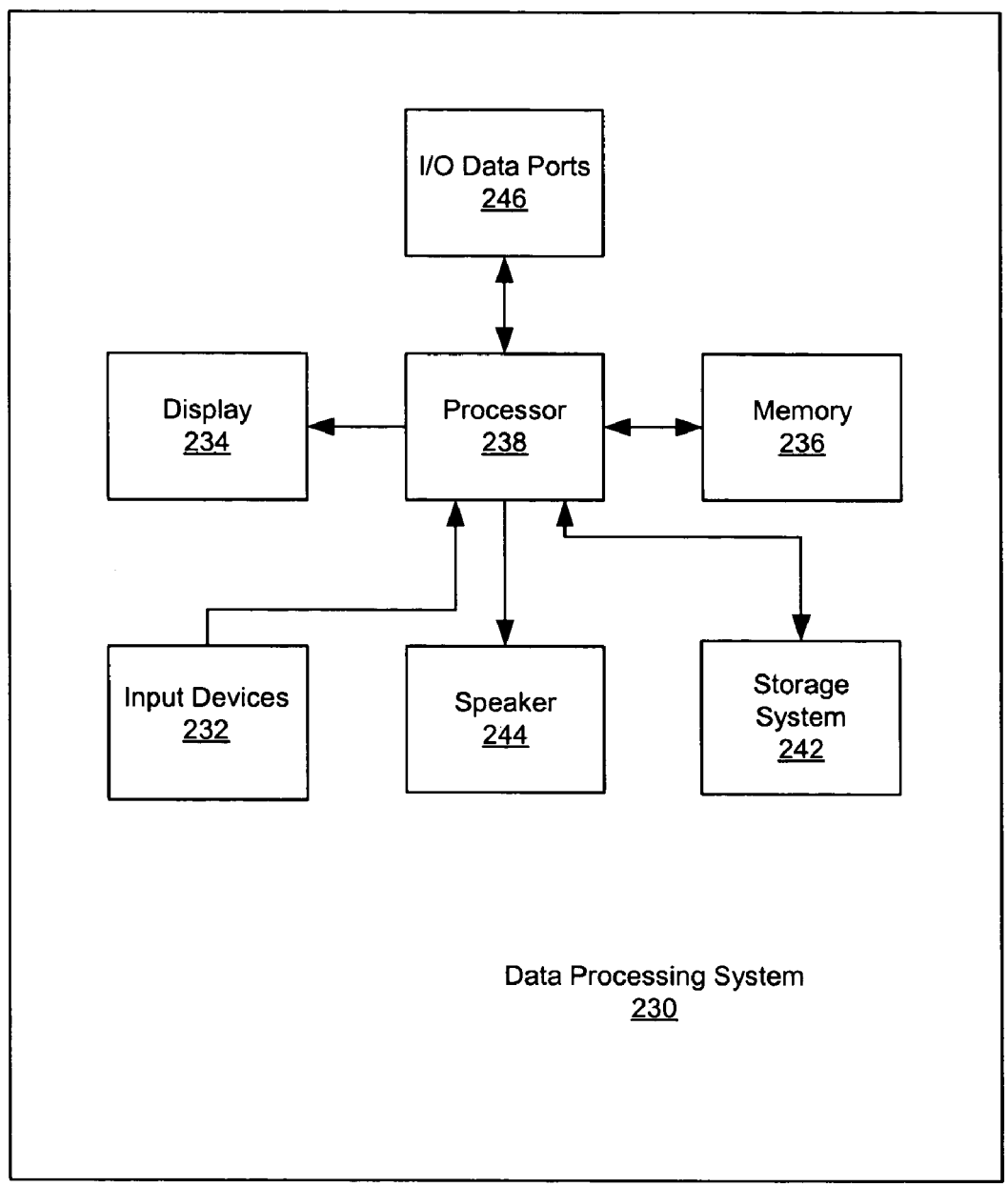
FIG. 2 is a block diagram of data processing systems according to embodiments of the present invention.

Referring now to FIG. 2, an exemplary embodiment of a data processing system 230 suitable for use as either an authentication server 100, a file server 102, a personal key server 108 or a client data processing system 106 and/or 106' in accordance with embodiments of the present invention is illustrated and may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 3:
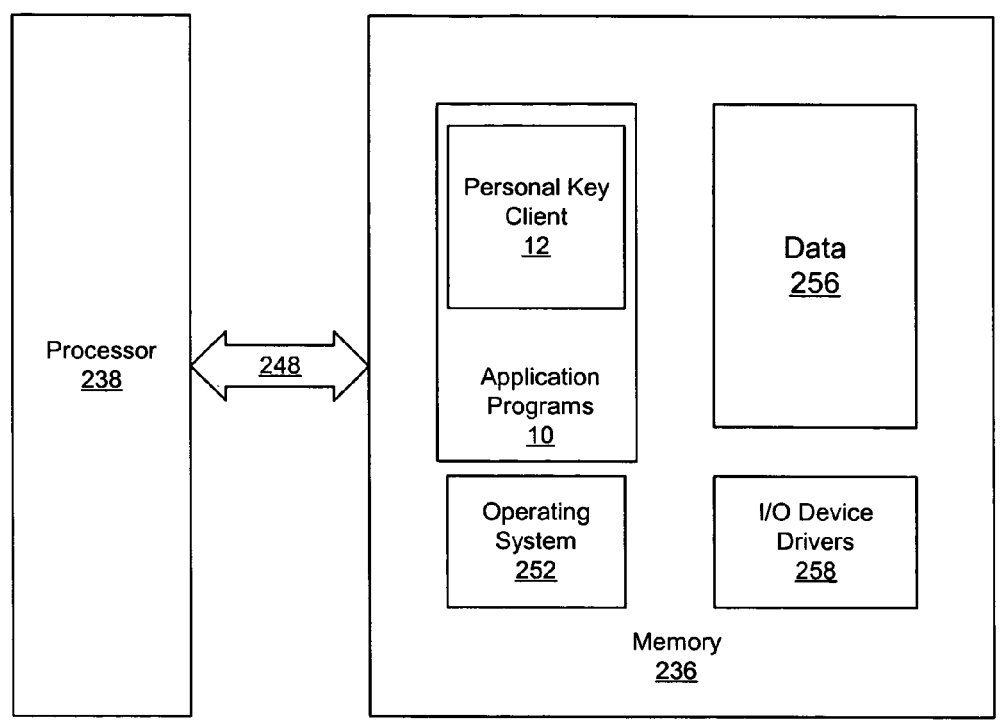
FIG. 3 is a more detailed block diagram of data processing systems according to embodiments of the present invention.

FIG. 3 is a block diagram of data processing systems that illustrate systems, methods, and computer program products in accordance with embodiments of the present invention. The processor 238 communicates with the memory 236 via an address/data bus 248. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may contain several categories of software and data used in the data processing system 230: the operating system 252; the application program(s) 10; the input/output (I/O) device drivers 258; and the data 256. As will be appreciated by those of skill in the art, the operating system 252 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 258 typically include software routines accessed through the operating system 252 by the application program 10 to communicate with devices such as the input devices 232, the display 234, the speaker 244, the storage system 242, the I/O data port(s) 246, and certain memory 236 components. The application program(s) 10 is illustrative of the programs that implement the various features of the data processing system 230. Finally, the data 256 represents the static and dynamic data used by the application program(s) 10, operating system 252, I/O device drivers 258, and other software programs that may reside in the memory 236.

As is further seen in FIG. 3, for client processing systems, the application program(s) 10 preferably includes a personal key client 12. The personal key client 12 may function as described herein for providing access to encrypted files. For server data processing systems, the application program 10 may, instead, include one or more of an authentication server module, a file server module or a personal key server module (not shown) which may store and control access to encrypted files and encrypted file headers as described herein.

While the present invention is illustrated, for example, with reference to a personal key client 12 and an authentication server, a file server and a personal key server which carry out the operations for software installation, as will be appreciated by those of skill in the art, the functions carried out by these modules may also be incorporated into for example, the operating system 252. Thus, the present invention should not be construed as limited to the configuration of FIG. 3 but is intended to encompass any configuration capable of carrying out the operations described herein.

Figure 4:
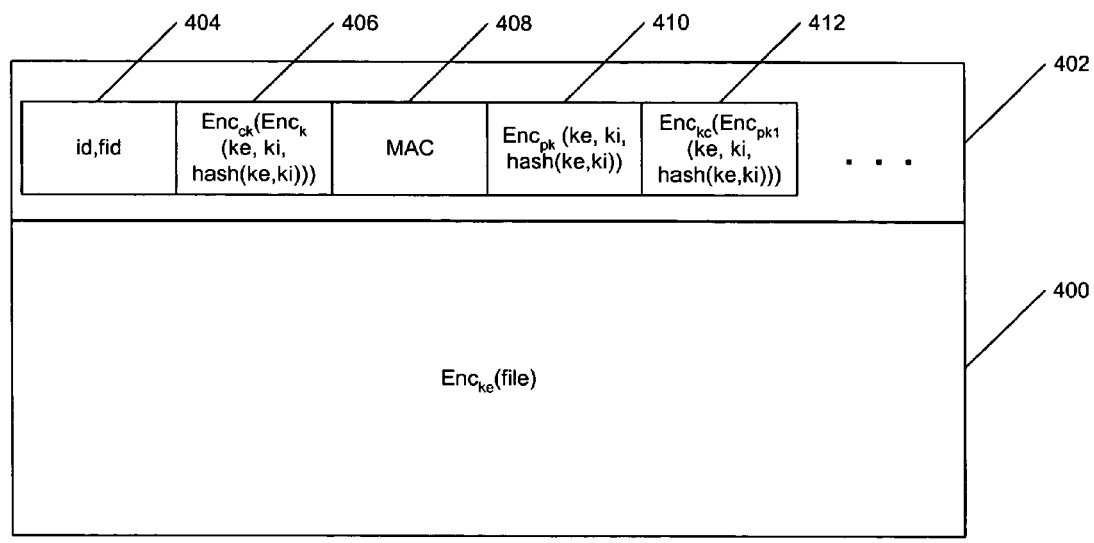
FIG. 4 is a block diagram of a file and file header according to embodiments of the present invention.

As briefly described above, in embodiments of the present invention, an encrypted file and an encrypted file header are associated with each other. FIG. 4 illustrates such an arrangement. As seen in FIG. 4, an encrypted file 400 may be a file which was encrypted with an encryption key ke and is illustrated in FIG. 4 as $ENC_{ke}(file)$. An encrypted file header 402 is also provided. The file header 402 may contain both encrypted an unencrypted portions. As illustrated in FIG. 4, the file header may contain the tuple (id, fid) 404 where id is a user identification of an owner of the file and fid is a file identification associated with the file.

A file encryption key is stored in the file header 402 encrypted under a personal key k belonging to the user, derived from a user-supplied "passphrase/password." Such an encrypted file encryption key 406 is illustrated as $Enc_{ck}(Enc_k(ke, ki, hash(ke, ki)))$ in FIG. 4. The file encryption key may also be encrypted with a public key or keys pk of one or more trusted third parties an incorporated in the file header 402 so as to allow third parties access to the file contents. Such an encrypted file encryption key 410 is illustrated as $Enc_{ck}(Enc_{pk}(ke, ki, hash(ke, ki)))$ in FIG. 4. A message authentication code (MAC) 408 may also be included within the file header 402 to verify the authenticity of the file after decryption. Furthermore, the file encryption key may also be stored in the file header 402 encrypted under a public key pk belonging to a trusted third party. Such an encrypted file encryption key 410 is illustrated as $Enc_{pk}$ (ke, ki, hash(ke, ki))) in FIG. 4. Note that the file encryption key is not encrypted with the control key. Finally, one or more copies of the file encryption key may be stored in the file header 402 encrypted under a public key pkl through pkn belonging to a user with access to the encrypted file. Such an encrypted file encryption key 412 is illustrated as $Enc_{ck}$ ($Enc_{pkl}$(ke, ki, hash(ke, ki))) in FIG. 4.

As illustrated in FIG. 4, the file encryption key may be stored in the file header encrypted under two keys: a personal key belonging to the user and a system key, called a control key, which is generated, managed, and controlled by the personal key server 108. In this case, both parties—the user and the personal key server 108—authorize access to an encrypted file. The personal key server 108 may require the personal key client to present it with a valid ticket issued to the personal key client by the authentication server 100. That is, the user must first be authenticated to the authentication server 100. Only then, will the personal key server 108 use its control key to decrypt the file encryption key. Since the file encryption key has been doubly encrypted, first with the personal key derived from the user's "passphrase" and second with the control key, the decrypted value returned by the personal key server 108 to the personal key client is the file encryption key encrypted with the personal key of the user. Hence, the key management solution is such that a file encryption key can be recovered in the clear, thus, enabling the encrypted file be decrypted, if the user desires to recover the file and the user has been authenticated to the system by the authentication server.

The personal key server 108 maintains an access control list (ACL) in its database to allow access to the file by potentially many system users. The access control list prescribes the rights of access to each file by each system user. If the user requesting access is in the access control list, the personal key server 108 will decrypt the encrypted file key under the control key and return same to the personal key client of the requesting user.

In various embodiments of the present invention, different options for key management may be provided when access to an encrypted file by a user, other then the file owner, is desired or required. The user who initially creates an encrypted file is also called the file owner. When access to an encrypted file by a user, other then the file owner, is desired or required, the file encryption key could be encrypted under a public key of the other user, in lieu of encrypting it with a personal key of that other user. Such an encryption is illustrated in FIG. 4 as the encrypted key 412. A second option would be to omit encrypting the file encryption key under a key belonging to the other user, and allow the personal key server to encrypt the key under its control key. That is, the file encryption key could be singly encrypted under the control key instead of doubly encrypted under a key belonging to the other user and the control key. In the second option, the encrypted key 412 would be $Enc_{ck}$ (ke, ki, hash (ke, ki)) in FIG. 4.

The personal key client provides the file server 102 with a ticket to prove its identity and for the file server 104 to enforce rules such as only allowing valid users to store files in the file server's database, or only the file owner of an existing file being allowed to replace the encrypted file or file header with an updated copy of the encrypted file or file header.

Embodiments of the present invention may provide enhancements to systems with fewer components such as that described in detail in commonly assigned and concurrently filed U.S. patent application Ser. No. 09/642,878, entitled "SECURE DATA STORAGE AND RETRIEVAL IN A CLIENT SERVER ENVIRONMENT", the disclosure of which is incorporated by reference as if set forth fully herein.

For access to the resources at the file server 102, the user may have a unique "userid" denoted by id. There can be any number of users but each user should have a unique userid (i.e., ID) with regard to the file encryption system. Each file that the user wants to store on the file server has a "fileid" denoted by fid. The fileids generated for a given userid should be unique with regard to a particular file system. The fileid may, for example, be generated from a file name provided by a user. However, fileids need not be unique across all users. Thus, the tuple (id, fid) uniquely identifies a single file on the file server 102 even though there might be many files on the file server 102 with the same fid. All the files on the file server belonging to a given userid (i.e., id) may be identified by the tuple (id, *) Similarly, less than all of the files could be identified for a user with various wildcard values for the fileid. A file may contain any form of digital data such as video, audio, text, etc.

The file server 102 may honor all requests for access to encrypted files. Thus, a user who requests a file from the file server 102, corresponding to tuple (id, fid) will be given the requested file if it exists and can be located. Thus, the file server 102 will typically not "screen" requests for files. Access to the unencrypted file is controlled via the file encryption key management system (i.e., via the encryption keys). However, the file server 102 does control requests to store encrypted files in the file server's database. Otherwise, an adversary could issue a request to the file server to store a file under a duplicate tuple (id, fid), thereby possibly causing duplicate files to be stored under the same tuple (id, fid). In addition, an adversary could cause unauthorized files to be stored under another user's id.

As is described in more detail below, for data protection, each user selects a "password" or "passphrase" denoted by pw. The password may be considered to be a secret value that only the user knows. The user password/passphrase is not stored by the system. As is further described below, the user may change their password/passphrase.

As described above, systems for user data storage and retrieval according to the present invention may be embodied as a personal key client resident in the user's personal computer, an authentication server, a personal key server and a file server where encrypted files are maintained within the system. Operations of the personal key client, the authentication server, the personal key server and the file server will now be described with reference to FIGS. 5 through 19.

The operations for file management illustrated in FIGS. 5 through 19 may provide core functions which provide for the control of encrypted files. Thus, as will be appreciated by those of skill in the art in light of the present disclosure, these core functions may be further manipulated to provide additional file management functions. For example, a rename file operation could be associated with a file by retrieving the file and storing the file with the new file name. Optionally, the old file could be overwritten, deleted, or marked as inaccessible. Similarly, user access, third party access to files and file ownership may be changed through the retrieval, storage and password or key change operations. Thus, for example, to change which users are trusted third parties, the public key operations descried below could be utilized to replace one third parties public key with anothers and, thereby, provide access to file to a different third party. Similarly, file ownership could be changed by allowing the new owner third party access to the file, the new owner could retrieve the file and store the file under a new tuple (id, fid) and, thereby, obtain ownership of the file. Thus, the core functions described herein may provide a robust feature set which may be readily expanded through combinations of operations. Furthermore, additional "file management" functions could also be incorporated, for example, utilizing conventional file server operations.

Figure 5:
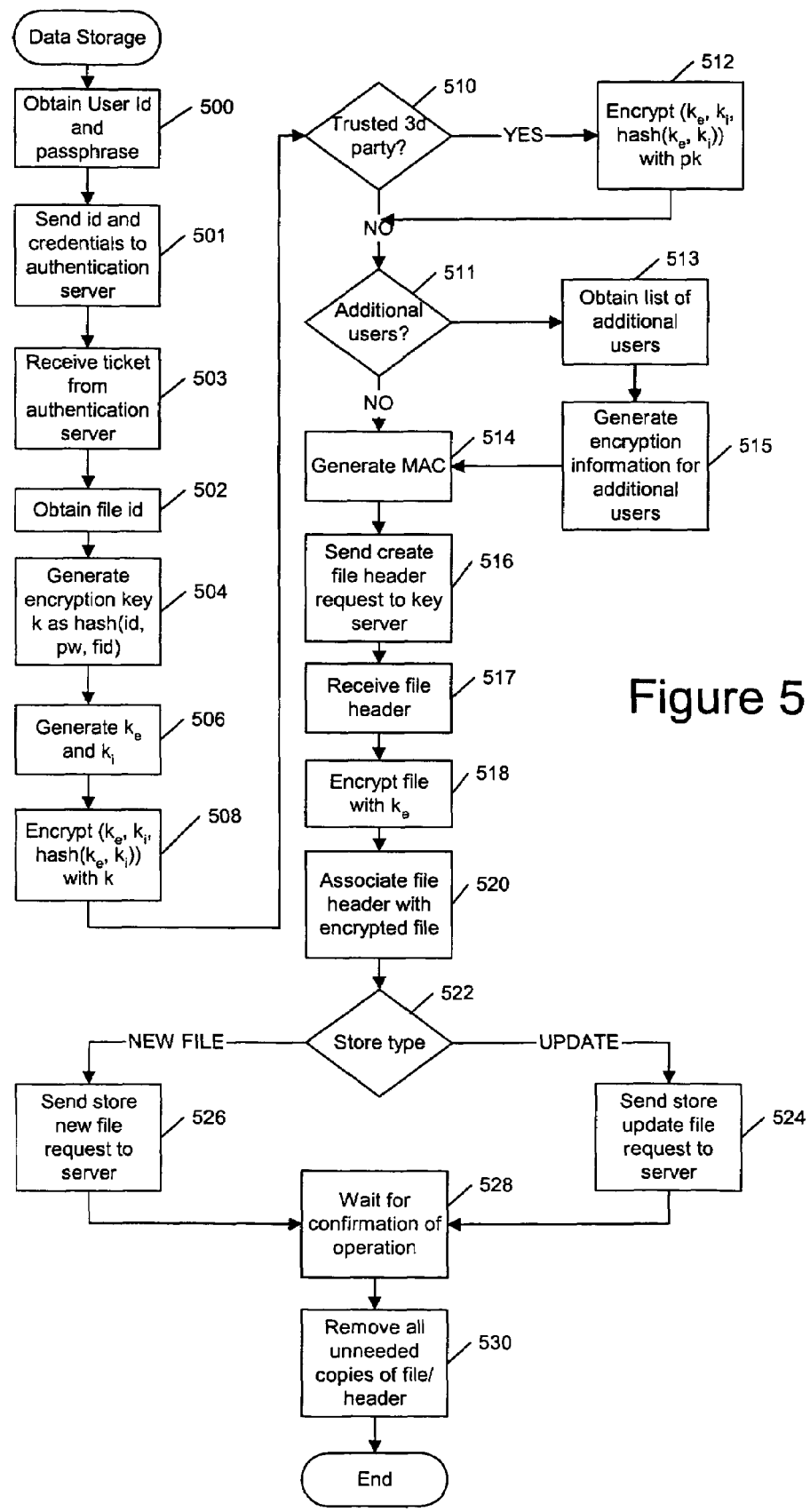
FIG. 5 is a flowchart illustrating operations of a client of an owner of a file for creating or updating an encrypted file according to embodiments of the present invention.
Figure 6:
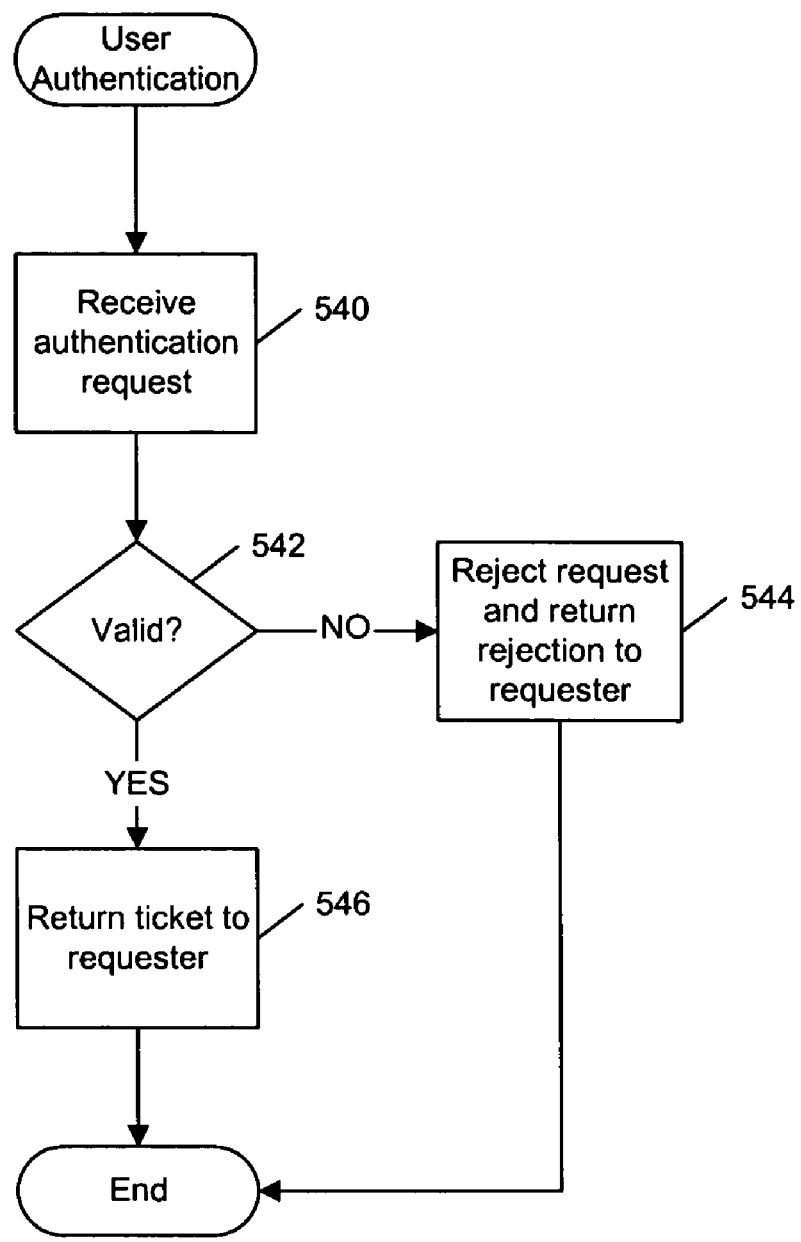
FIG. 6 is a flowchart illustrating operations of an authentication server according to embodiments of the present invention.
Figure 7:
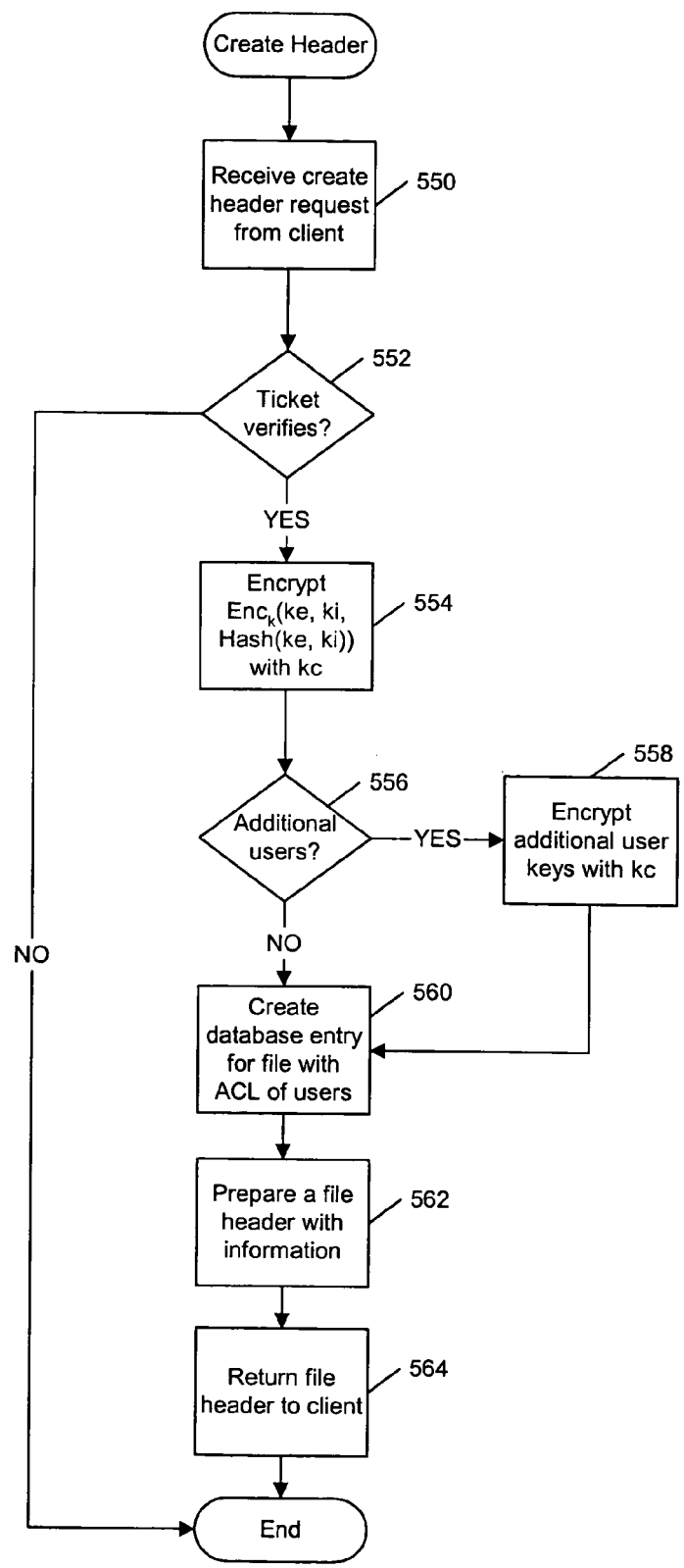
FIG. 7 is a flowchart illustrating operations of a personal key server for creating a file header according to embodiments of the present invention.
Figure 8:
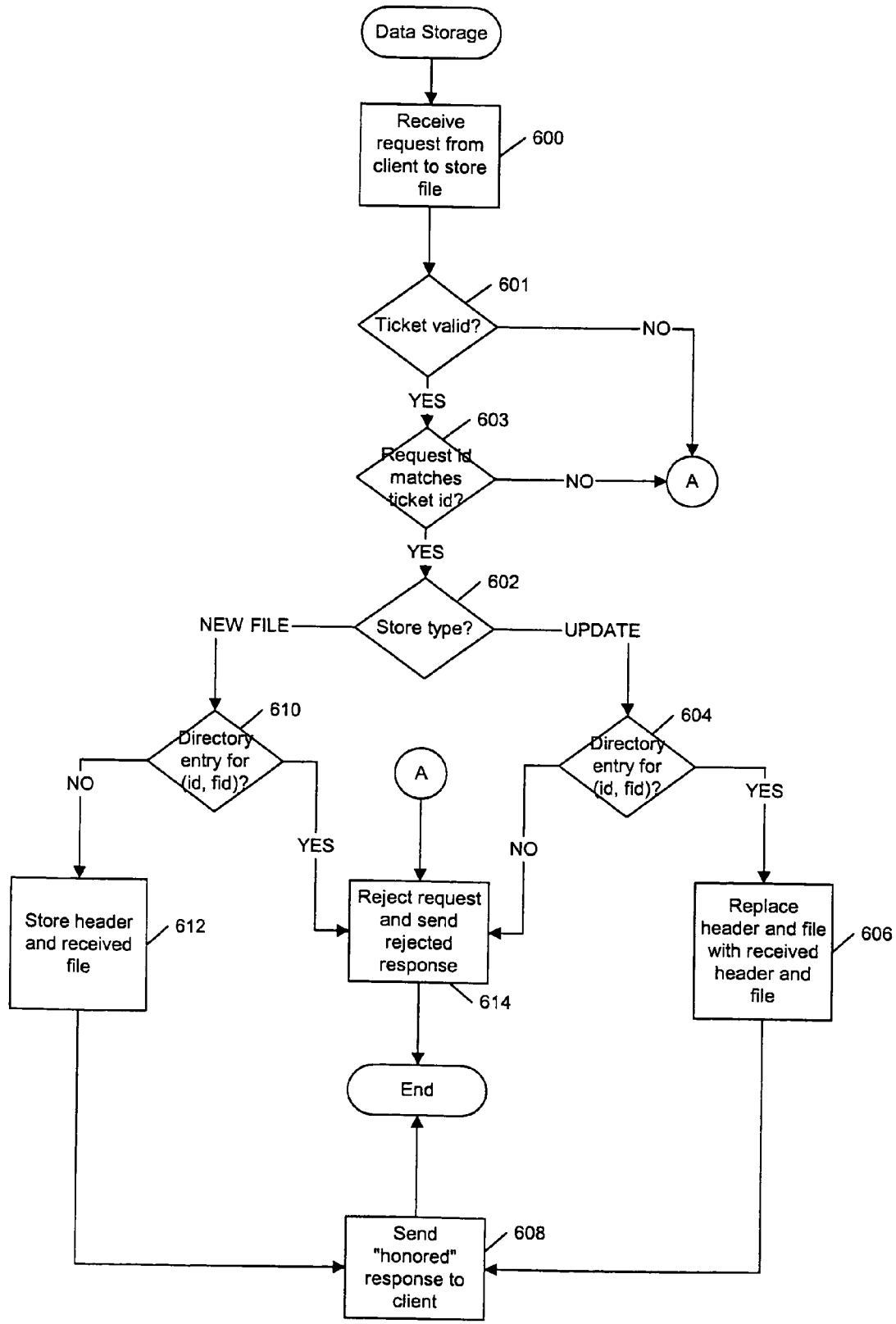
FIG. 8 is a flowchart illustrating operations of a file server for creating or updating an encrypted file according to embodiments of the present invention.

Data storage operations according to embodiments of the present invention will now be described with reference to FIGS. 5 through 8. FIG. 5 illustrates operations of a personal key client for data storage. FIG. 6 illustrates operations of the authentication server for data storage. FIG. 7 illustrates operations of a personal key server for data storage. FIG. 8 illustrates operations of the file server for data storage.

As seen in FIG. 5, when a user wants to encrypt a file and store the encrypted file on the file server, the user submits their userid (id) and password/passphrase (pw) associated with the file to the personal key client (block 500). The personal key client sends id and the user's credentials to the authentication server (block 501) to request authentication of the user as an authorized user. The credentials may include a representation of the value of pw associated with the file (e.g., a hash value computed on pw) or a different password/passphrase (i.e., different from the value of pw specified block 500).

Operations of the authentication server in response to receiving a request for authentication are seen in FIG. 6. As seen in FIG. 6, the authentication server receives the authentication request (block 540) and determines if the request is from a valid user (block 542). If the request is not valid, then the request is rejected and a rejection response is provided to the requester (block 544). If the request is valid, then a valid ticket may be provided to the requester (block 546). The authentication server may also inform the key server and the file server of valid tickets, for example, by expressly sending information or by a digital signature of the ticket, so that these servers may determine if a user provides a valid ticket.

As will be appreciated by those of skill in the art, the network authentication mechanism associated with the authentication server could be provided using a mechanism such as the Kerberos. As described in U.S. Pat. No. 5,495,533 to Linehan, Kerberos is described in Steiner, Jenneifer G., Neuman, B. Clifford, and Schiller, Jeffry, I., Kerberow: An Authentication Service For Open Network Systems, Usenex Conference Proceedings, pages 183–190, February 1988. A network authentication mechanism, such as Kerberos, keeps a password file on an authentication server. A special protocol is used to validate a userid and password entered on a user computer against the password file on the authentication server. The latter generates authentication data, embodied in a ticket, that identifies the user. For example, the user computer obtains from the authentication server a ticket to access the file server. The user computer forwards this ticket to the file server whenever the user wants to access a file. The file server relies on the contents of the ticket to identify the user. The files are retrieved over a link between the disk storage and the file server.

Kerberos uses cryptographic techniques to avoid sending the password on the network, to protect the contents of tickets, and to allow the file server to be certain that the tickets are both valid and issued by the authentication server. Advantages of this scheme include (1) the password is kept in one place rather than in (potentially) multiple user computers or file servers; (2) the password is not transmitted over the computer network; (3) each ticket contains a dynamically-generated encryption key shared by the user computer and the file server.

As described, under Kerberos, the user computer forwards the ticket to the file server whenever the user wants to access a file. However, according to embodiments of the present invention, the user computer forwards the ticket to the personal key client, as well as the file server, whenever the user wants to access a file. Additional information on suitable authentication systems, as well as Kerberos, may be found in *Applied Cryptography*, pp. 51–55 and 417–425.

As is further seen in FIG. 5, the user (or the personal key client) may pick a unique fileid (i.e., fid) for the file to be stored on the file server (block 502). The fileid may be based on a file name provided by the user. For example, the fileid may be the file name or may be generated from the file name.

The personal key client generates a key encrypting key k (block 504) based on the password/passphrase provided by the user. The key encrypting key k may be generated utilizing any suitable key generation technique, for example, the key may be generated as follows:

k=Hash(id, pw, fid)

The "Hash" function used here can be any strong collision-resistant one-way hash function such as SHA-1.

The personal key client also generates a random encryption key ke for encrypting the content of the file (block 506). Optionally, the personal key client generates a random integrity protection key ki for providing integrity protection on the content of the file (block 506). The encryption key ke and the integrity key ki may be generated utilizing any suitable random key generation technique. Such techniques are known to those of skill in the art and, therefore, will not be described further herein.

The personal key client encrypts ke, and, optionally, ki and a hash of ke, ki with k using, for example, a symmetric-key encryption algorithm (such as DES, Triple-DES, RC5, etc)(block 508). That is, $Enc_k$(ke, ki, Hash(ke, ki)).

The hash of ke, ki provides a verification value which may provide a way to do an integrity check on ke and ki when decrypted. The "Hash" function used here can be any strong collision-resistant one-way hash function such as SHA-1.

As is further illustrated in FIG. 5, optionally, the user may have the option to enable "file recovery by a trusted third party" in case, for example, they forget their password or if the file must be recoverable by a trusted third party. When this option is selected (block 510), the personal key client provides the public key (pk) of a trusted third party. Only the trusted third party with the corresponding secret key (sk) can decrypt any data encrypted with pk. When the "file recovery by a trusted third party" option is selected (block 510), the client encrypts ke, and optionally, ki and a hash of ke, ki with pk, for example, using an asymmetric-key encryption algorithm (such as RSA, Elliptic curve, etc)(block 512). That is, $Enc_{pk}$(ke, ki, Hash(ke, ki)).

As described above, the hash of ke, ki provides a way to do an integrity check on ke and ki when decrypted.

In addition to a trusted third party, the owner may authorize one or more users access to a file owned by the user. Thus, as seen at block 511, if additional users are authorized, a list of the users may be obtained (block 513) and encryption information generated for each of the authorized users (block 515). According to certain embodiments of the present invention, the encryption information is an unencrypted version of the encryption key, such as (ke, ki, Hash(ke, ki)). In other embodiments of the present invention, the encryption key is encrypted with a public key(s) associated with a user(s) (e.g. users 1 through n having corresponding encryption keys pk1 through pkn). Thus, the encryption information may take the form of, for example, $\text{Enc}_{pk1}$(ke, ki, Hash(ke, ki)). ... $\text{Enc}_{pkn}$(ke, ki, Hash(ke, ki)).

As a further option, the personal key client may generate a MAC (message authentication code) on the unencrypted content of the file (block 514). For example, the personal key client may utilize ki and a strong collision-resistant one-way hash function such as SHA-1 to generate the MAC. That is, MAC= Hash(file, ki). The personal key client may choose to split the file into pieces (e.g., piece$_1$, piece$_2$, ... ) and compute the MAC for each piece individually. This allows data recovery to be done in pieces which may be useful for audio or video applications when data streaming is used.

The personal key client prepares a file header, which may contain, among other things, the applicable values (id, fid), $\text{Enc}_k$(ke, ki, Hash(ke, ki)), MAC, $\text{Enc}_{pk}$(ke, ki, Hash(ke, ki)), $\text{Enc}_{pk1}$(ke, ki, Hash(ke, ki)). ... $\text{Enc}_{pkn}$(ke, ki, Hash(ke, ki)) as well as the list of authorized users (block 516) if provided in a particular embodiment. Thus, the personal key client may send a "create file header" request the personal key server, along with the values (id, fid), $\text{Enc}_k$(ke, ki, Hash(ke, ki)), MAC, $\text{Enc}_{pk}$(ke, ki, Hash(ke, ki)) and the ticket. If additional users are to be given access to the file, the personal key client also sends a list of user IDs to the personal key server, which represents the users who are to be given access to the file. Under certain embodiments, the personal key client also sends the value (ke, ki, Hash(ke, ki)) to the personal key server. Under other embodiments, the personal key client also sends the several encrypted values $\text{Enc}_{pk1}$(ke, ki, Hash(ke, ki)), $\text{Enc}_{pk2}$(ke, ki, Hash(ke, ki)), etc., to the personal key server, i.e., one encrypted value for each additional user to be given access to the file.

FIG. 7 illustrates operations of the personal key server upon receiving a create file header request. As seen in FIG. 7, the personal key server receives the request to create a file header (block 550) and verifies the ticket received (block 552). If the ticket is invalid, then operations may terminate. Optionally, a rejected request message may be sent to the personal key client. The personal key server encrypts the encrypted encryption value, such as $\text{Enc}_k$(ke, ki, Hash(ke, ki)), with its control key, kc, thereby producing the encrypted value $\text{Enc}_{kc}(\text{Enc}_k$(ke, ki, Hash(ke, ki))) (block 554). If the personal key client requests that additional users be given access to the file (block 556), then additional processing to encrypt the additional user key values with the control key (block 558). According to certain embodiments of the present invention, the personal key server encrypts the received value (ke, ki, Hash(ke, ki)) under kc, thereby producing the encrypted value $\text{Enc}_{kc}$(ke, ki, Hash(ke, ki)). In other embodiments, the personal key server encrypts the several received values $\text{Enc}_{pk1}$(ke, ki, Hash(ke, ki)), $\text{Enc}_{pk2}$(ke, ki, Hash(ke, ki)), etc., under kc, thereby producing the encrypted values $\text{Enc}_{kc}(\text{Enc}_{pk1}$(ke, ki, Hash(ke, ki))), $\text{Enc}_{kc}$($\text{Enc}_{pk2}$(ke, ki, Hash(ke, ki))), etc.

In any event, the personal key server creates a new entry in the database, which includes building an access control list of authorized users that are entitled to access the encrypted file (block 560). The personal key server also prepares a file header (block 562), which contains among other things the values (id, fid), $\text{Enc}_{kc}(\text{Enc}_k$(ke, ki, Hash(ke, ki))), MAC, and $\text{Enc}_{pk}$(ke, ki, Hash(ke, ki)). If additional users are to be given access to the file, then additional information is incorporated into the file header. Thus, according to certain embodiments, the encrypted value $\text{Enc}_{k}$c(ke, ki, Hash(ke, ki)) is also stored in the file header. In other embodiments, the several encrypted values $\text{Enc}_{kc}$($\text{Enc}_{pk1}$(ke, ki, Hash(ke, ki))), $\text{Enc}_{kc}$($\text{Enc}_{pk2}$(ke, ki, Hash(ke, ki))), etc., are also stored in the file header. The file header is returned to the personal key client (block 564). Note that the encrypted value $\text{Enc}_{pk}$(ke, ki, Hash(ke, ki)) is not further encrypted with the control key kc.

Returning to FIG. 5, the personal key client also encrypts the content of the file with ke using a symmetric-key encryption algorithm (such as DES, Triple-DES, RC5, etc) (block 518). That is, $\text{Enc}_{ke}$(file). Again, the personal key client may choose to split the file into pieces (e.g., piece$_1$, piece$_2$, ... ) and encrypt each piece individually. This may allow data recovery to be done in pieces which may be useful for audio or video applications when data streaming is used.

The personal key client next associates the file header with the encrypted file (block 520). The header associated with each file preferably accompanies the file in case the file is moved or renamed or backed-up. The header may be associated with the file in a number of ways. For example, the header may be stored as the first few bytes of the file, as a trailer at the end of the file, in the file's directory entry, in a separate area associated with the file's directory entry, in a local database or combinations thereof.

The personal key client determines if the storage operation is an update or the creation of a new file (block 522) and sends a "store new encrypted file" request (block 526) or a "store updated encrypted file" request (block 524) to the file server that includes the encrypted file, $\text{Enc}_{ke}$(file), the file header and the ticket. A "store new encrypted file" request indicates that the encrypted file is a new file to be stored under the tuple (id, fid), whereas a "store updated encrypted file" request indicates that the encrypted file is intended to replace an existing file currently stored under the tuple (id, fid). In either case, the personal key client waits for confirmation of the store request (block 528).

Turning now to FIG. 8, the operations of the file server may begin when the file server receives either the "store new encrypted file" or the "store updated encrypted file" requests (block 600). The file server verifies the validity of the received ticket (block 601) and then verifies that the id in the received tuple (id, fid) matches the userid in the ticket (block 603). The latter check on id is performed to ensure that only valid users, and more particularly only the file owner, can store an encrypted file, either a new file or an updated file, in the file server database. If both checks succeed, the procedure continues. Otherwise, the received "store new encrypted file" request or "store updated encrypted file" request is rejected (block 614).

If a "store new encrypted file" request is received (block 602), the file server verifies that no directory entry exists for the tuple (id, fid) received in the "store new encrypted file" request (block 610). If no such directory entry exists, the file server creates a new file directory entry, it stores the file header in accordance with a predetermined one of the aforementioned techniques for associating the file header with the encrypted file, and it stores the received encrypted file in its database (block 612). Otherwise, the "store new encrypted file" request is rejected and a rejected response is sent to the client (block 614).

If a "store updated encrypted file" request is received (block 602), the file server verifies that a directory entry exists for the tuple (id, fid) received in the "store updated encrypted file" request (block 604). If such a directory entry exists, the file server replaces the current file header with the received file header, and it replaces the current encrypted file with the received encrypted file (block 606). Otherwise, the "store updated encrypted file" request is rejected and a rejected response sent to the client (block 614).

If, however, either of the store operations are successful, the file server sends a response message to the personal key client indicating that the "store new encrypted file" or "store updated encrypted file request has been honored (block 608).

Returning to FIG. 5, when the personal key client receives the response from the file server (block 528), the personal key client deletes all the information associated with this file encryption operation from its memory/storage (i.e., keys, password/passphrase, encrypted information) (block 530). If the method for associating the file header with the encrypted file calls for the file header to be stored locally, in a local database, then the file header is so stored and only the working copy of the file header is deleted from its memory/storage. The nature of the response from the file server may also, optionally, be reported to the user.

Figure 9:
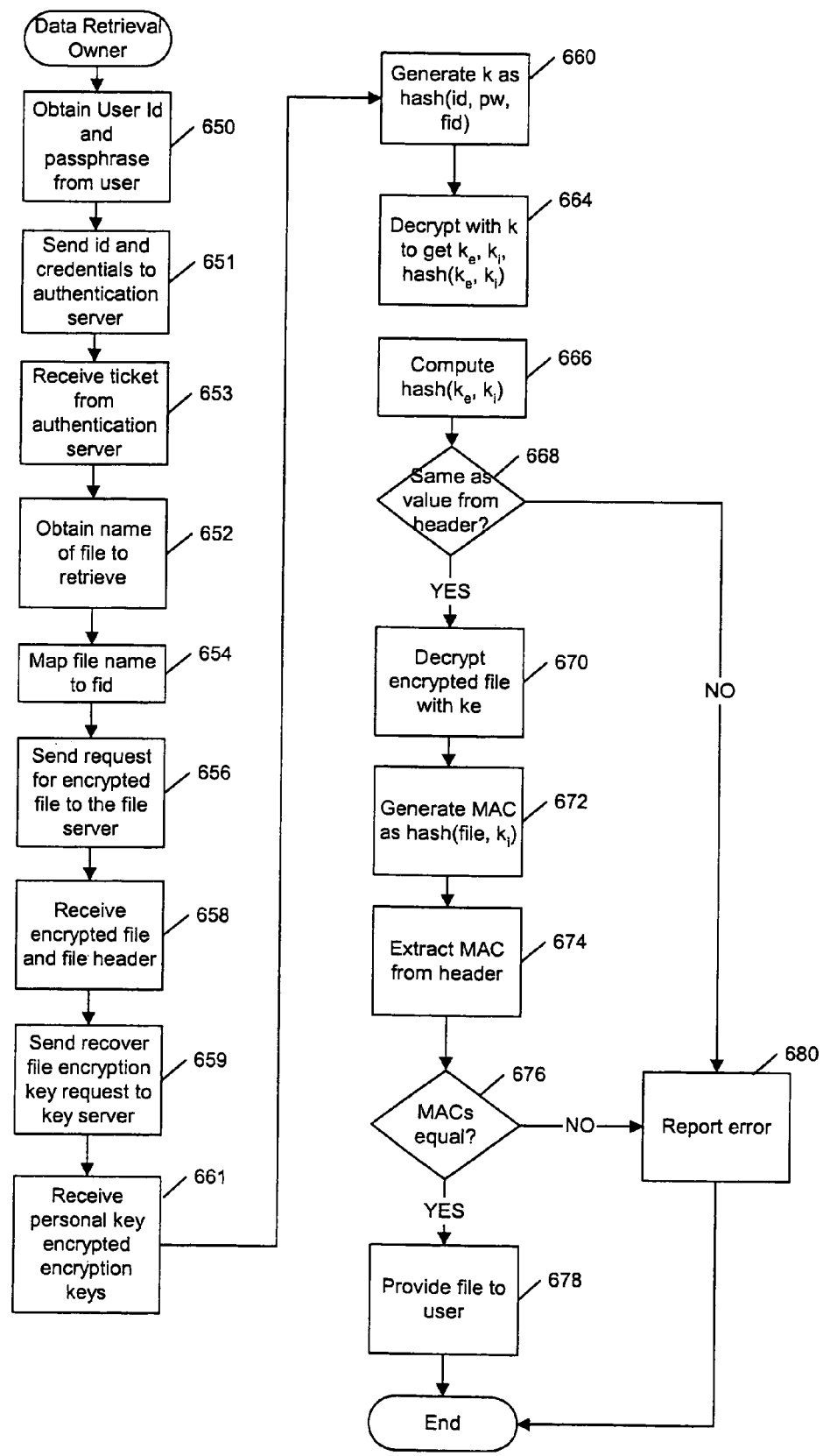
FIG. 9 is a flowchart illustrating operations of a client of an owner of a file for retrieving an encrypted file according to embodiments of the present invention.
Figure 10:
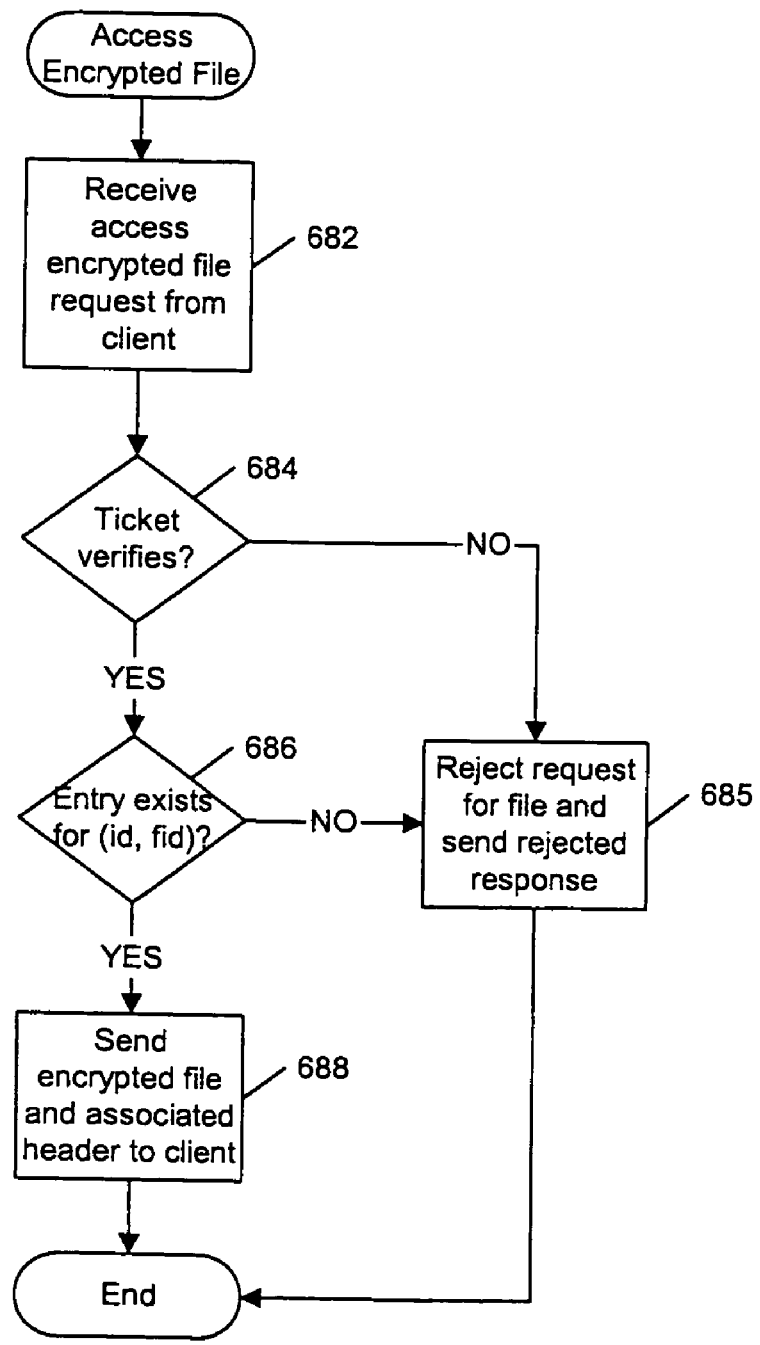
FIG. 10 is a flowchart illustrating operations of a file server for retrieving an encrypted file according to embodiments of the present invention.
Figure 11:
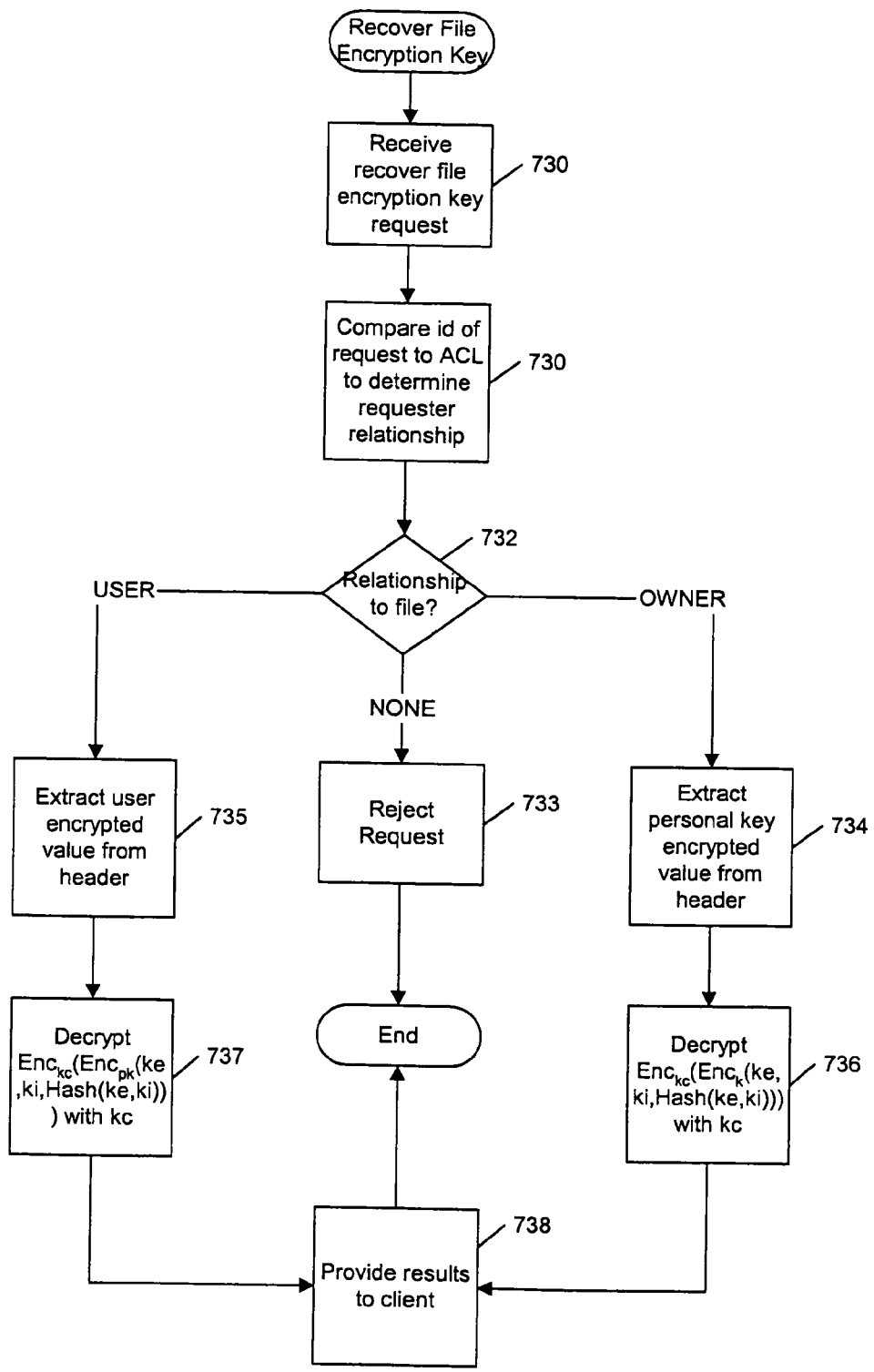
FIG. 11 is a flowchart illustrating operations of a key server in response to a request to recover an encryption key according to embodiments of the present invention.
Figure 12:
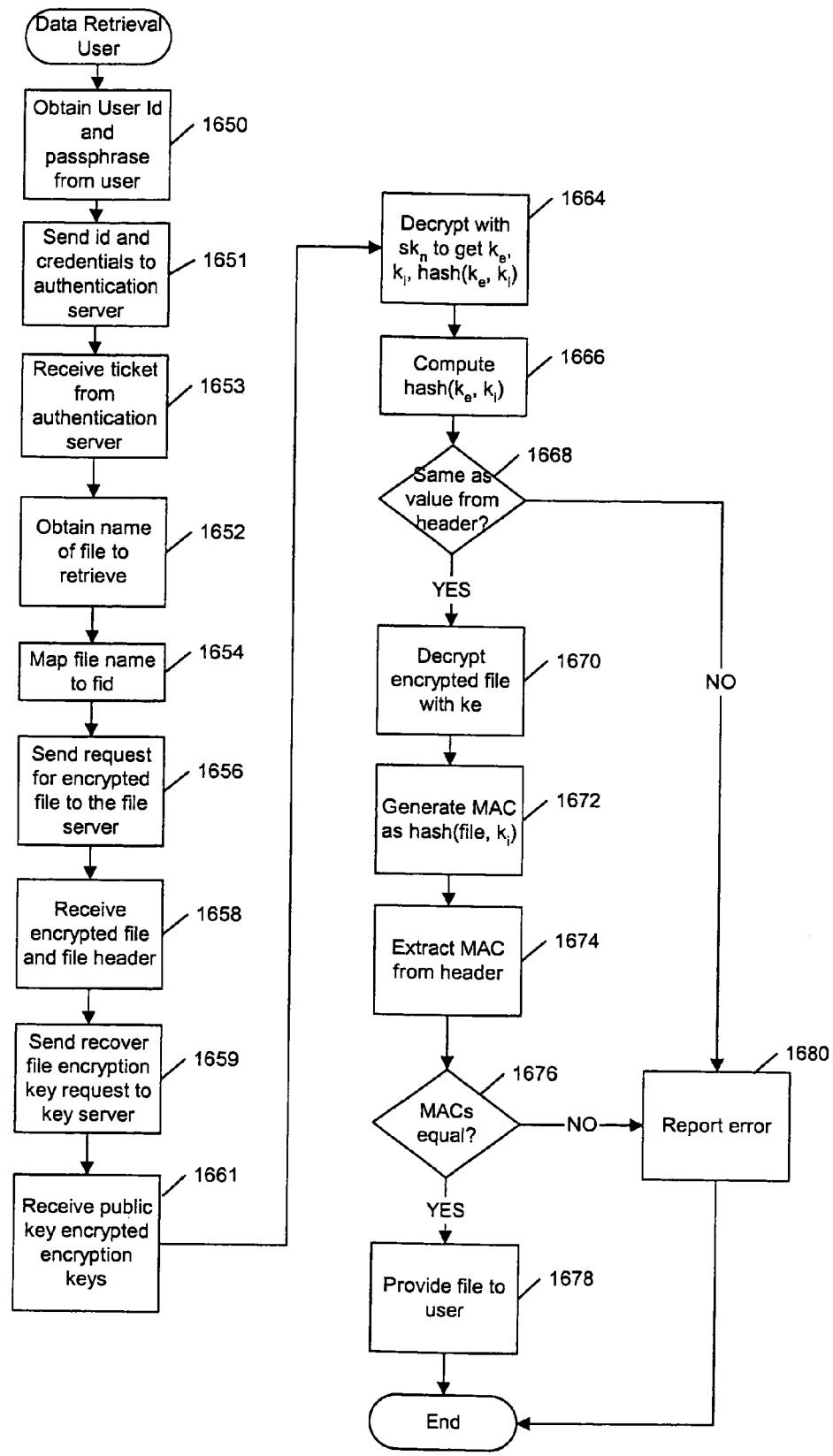
FIG. 12 is a flowchart illustrating operations of a client of a user associated with a file for retrieving an encrypted file according to embodiments of the present invention.
Figure 13:
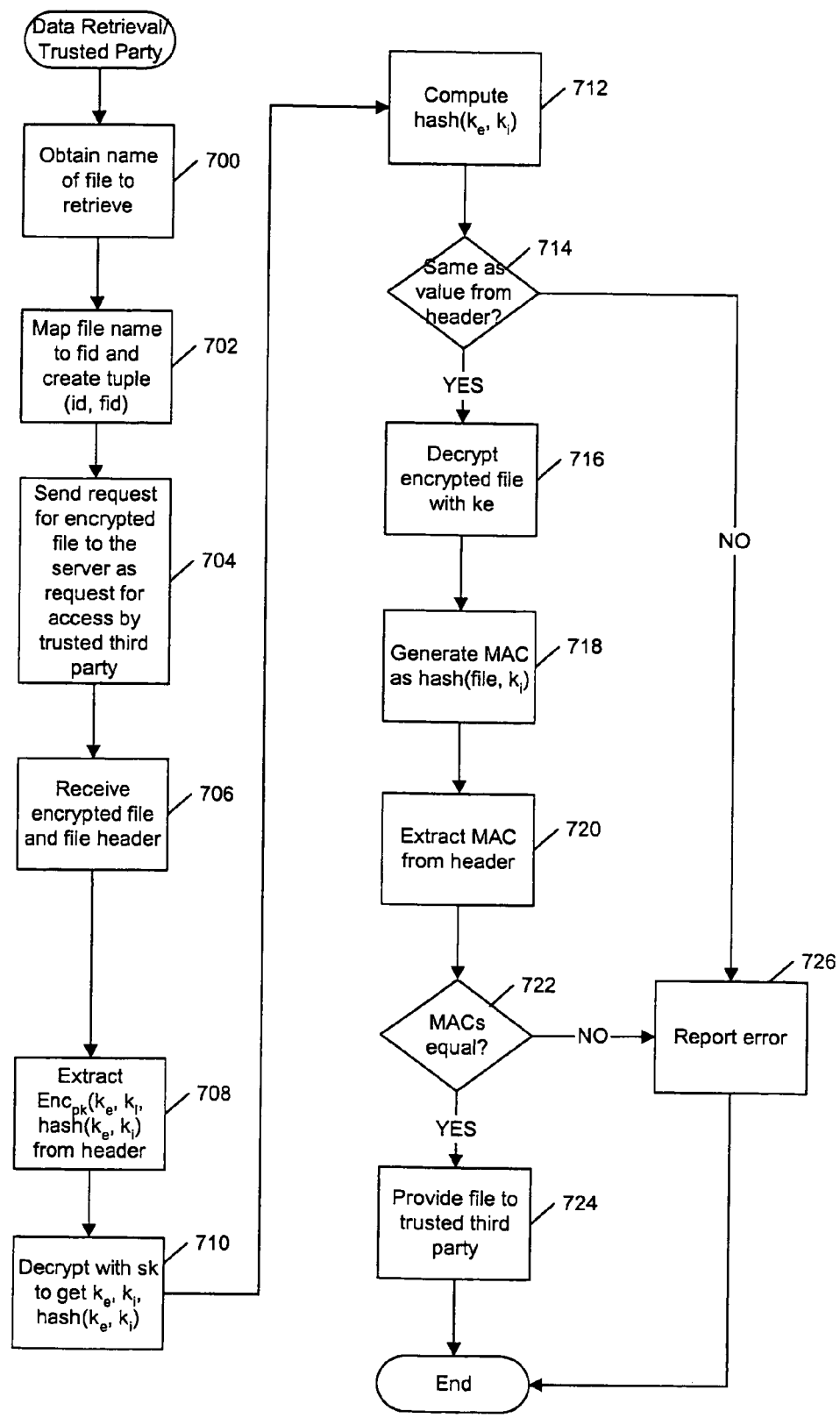
FIG. 13 is a flowchart illustrating operations of a client of a trusted third party associated with a file for retrieving an encrypted file according to embodiments of the present invention.
Figure 14:
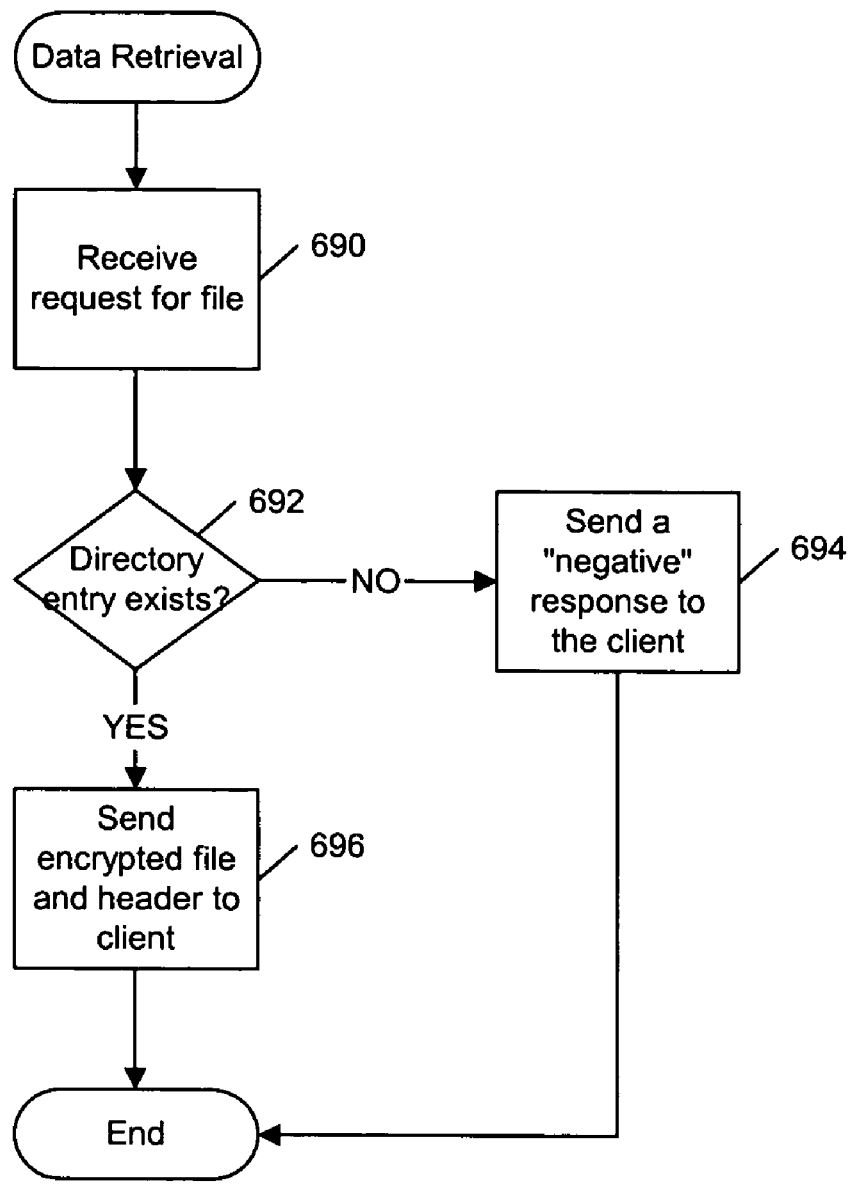
FIG. 14 is a flowchart illustrating operations of a file server in response to a request to retrieve a file by a trusted third party associated with a file according to embodiments of the present invention.

Operations for data retrieval will now be described with reference to FIGS. 9 through 14. FIG. 9 illustrates operations of the personal key client for data retrieval by the file owner. FIG. 10 illustrates operations of the file server for data retrieval by the file owner or by a trusted third party. FIG. 11 illustrates operations of the personal key server for data retrieval by a file owner file user. FIG. 12 illustrates operations of the personal key client for data retrieval by an authorized user. FIG. 13 illustrates operations for data retrieval by a trusted third party. FIG. 14 illustrates operations of the file server for data retrieval by a trusted third party. As seen in FIGS. 9 through 14, a file stored on a file server may be retrieved and recovered by a user with access rights such as the file owner, a trusted third party or other authorized users.

Turning to FIG. 9, when a user wants to retrieve and decrypt a file stored on the file server, the user submits their userid (id) and password/passphrase (pw) to the personal key client (block 650). The personal key client sends id and the user's credentials to the authentication server (block 651) to request authentication of the user as an authorized user. As described above, the credentials may include a representation of the value of pw associated with the file (e.g., a hash value computed on pw) or a different password/passphrase (i.e., different from the value of pw specified block 650).

Operations of the authentication server in response to receiving a request for authentication are seen in FIG. 6. As described above, the authentication server provides a ticket to the personal key client in response to the authentication request which is received by the personal key client (block 653).

The user also requests access to a named file (corresponding to a fid) stored on the file server (block 652) by, for example, either specifying a file name of a fileid. If a file name is specified, the personal key client maps the named file to a file ID (fid) (block 654). In either case, the personal key client sends an "access encrypted file" request, along with the tuple (id, fid), to the file server (block 656). The personal key client then waits to receive the response to the request from the file server.

Turning to FIG. 10, when the file server receives the request to access the encrypted file (block 682), the file server verifies the validity of the received ticket (block 684). If the ticket is not valid, the request is rejected and a rejected response may be provide to personal key client (block 685). The file server also verifies that a directory entry exists for the tuple (id, fid) received in the "access encrypted file" request (block 686). If so, the file server responds by sending the encrypted file, $Enc_{ke}(file)$, and its associated file header to the personal key client (block 688). If a directory entry does not exist for the tuple (id, fid), then the file server sends a "negative" response message to the personal key client (block 685).

Returning to FIG. 9, when the personal key client receives the response from the file server, if the response is negative, then operations of FIG. 9 may terminate at block 656 and, optionally, the error may be reported to the user. However, if the response provides the encrypted file and file header, the personal key client receives the encrypted file and file header (block 658) and sends a "recover file encryption key" request to the personal key server containing the ticket, the user id and the file header (block 659).

Turning to FIG. 11, the operations of the personal key server are illustrated in responding to a recover file encryption key request. As seen in FIG. 11, upon receiving the "recover file encryption key" request (block 730), the personal key server compares the user id (from the ticket) against the user id of the file owner and the ids of other users in its stored access control list (block 730). Based on this comparison, the personal key server may determine the relationship between the user requesting recovery of the encryption key and the encrypted file (e.g. owner, user or no relationship)(block 732). If the requestor's id is not found (block 732), then the personal key server rejects the access request (block 733). Optionally, a message may be returned informing the personal key client that the request was rejected. However, if the id is found, and it matches the id of the file owner, then the personal key server extracts the encrypted value $Enc_{kc}(Enc_k(ke, ki, Hash(ke, ki)))$ from the file header (block 735), decrypts it with its control key kc (block 737), and sends the decrypted value $Enc_k(ke, ki, Hash(ke, ki))$ back to the personal key client (block 738). On the other hand, if the id is found, and it matches id of one of the other users to be given access to the file, other than the file owner, then the personal key server extracts the encrypted value $Enc_{kc}(ke, ki, Hash(ke, ki))$ or $Enc_{kc}(Enc_{pki}(ke, ki, Hash(ke, ki)))$ depending on the particular embodiment from the file header (block 734), decrypts the extracted value (block 736) with its control key kc, and sends the decrypted value (ke, ki, Hash(ke, ki)) or $Enc_{pki}(ke, ki, Hash(ke, ki))$ back to the personal key client (block 738). A used herein, pki is the public key of the "other user."

Returning to FIG. 9, the personal key client receives the recovered personal key encrypted file encryption key from the personal key server (block 661) generates a key encrypting key k (block 660). The key encrypting key k may be generated, for example, as follows:

k=Hash(id, pw, fid).

The personal key client decrypts the received value, such as $Enc_k(ke, ki, Hash(ke, ki))$, from the personal key server with k to recover the encrypted values (block 664), such as ke, ki and Hash(ke, ki). That is, ke, ki, Hash(ke, ki)=$Dec_k(Enc_k(ke, ki, Hash(ke, ki)))$. The personal key client computes Hash(ke, ki) on the decrypted ke, ki (block 666) if Hash(ke, ki) is provided in the header and compares it with the decrypted value of Hash(ke, ki) to see if they are equal (block 668). If they are equal, then ke and ki are recovered correctly and they have not been changed. If the keys have been recovered correctly, the personal key client decrypts the encrypted file $Enc_{ke}$(file) with ke (block 670). That is, file=$Dec_{ke}(Enc_{ke}$(file)).

If the hash values are not equal, then an error has occurred and the error may be reported to the user (block 680). Operations would then terminate.

If a MAC is incorporated in the file header, then operations of blocks 672 through 676 may be performed. The personal key client generates a MAC (message authentication code) on the decrypted content of the file with ki (block 672). For example, the MAC may be generated by determining, MAC=Hash(file, ki).

The personal key client checks to see if the MAC that it generated is equal to the MAC that it received in the file header from the file server (block 676). If they are equal, then the file is recovered correctly and its content has not been changed and the contents may be provided to the user (block 678). If the MAC values are not equal, then an error has occurred, the error may be reported to the user (block 680) and operations may terminate.

FIG. 12 illustrates the operations of the personal key client when an "other user" accesses the encrypted file. When an "other user" wants to retrieve and decrypt a file stored on the file server, the user submits their userid (id) and password/passphrase (pw) to the personal key client (block 1650). The personal key client sends id and the user's credentials to the authentication server (block 1651) to request authentication of the user as an authorized user. As described above, the credentials may include a representation of the value of pw associated with the file (e.g., a hash value computed on pw) or a different password/passphrase (i.e., different from the value of pw specified block 1650).

Operations of the authentication server in response to receiving a request for authentication are seen in FIG. 6. As described above, the authentication server provides a ticket to the personal key client in response to the authentication request which is received by the personal key client (block 1653).

The user also requests access to a named file (corresponding to a fid) stored on the file server (block 1652) by, for example, either specifying a file name of a fileid. If a file name is specified, the personal key client maps the named file to a file ID (fid) (block 1654). In either case, the personal key client sends an "access encrypted file" request, along with the tuple (id, fid), to the file server (block 1656). The personal key client then waits to receive the response to the request from the file server.

Operations of the file server are the same as described above with reference to FIG. 10, where, if the request is validated, the file server responds by sending the encrypted file, $Enc_{ke}$(file)), and its associated file header to the personal key client which receives the response from the file server. If the response is negative, then operations of FIG. 12 may terminate at block 1656 and, optionally, the error may be reported to the user. However, if the response provides the encrypted file and file header, the personal key client receives the encrypted file and file header (block 1658) and sends a "recover file encryption key" request to the personal key server containing the ticket, the user id and the file header (block 1659).

The operations of the personal key server are as described above with reference to FIG. 11. As described above, because the request is from an "other user," the personal key server will return either (ke, ki, Hash(ke, ki)) or $Enc_{pkt}$(ke, ki, Hash(ke, ki)) back to the personal key client. In the first instance, the operations of block 1664 may be skipped. However, in the second instance, the personal key client decrypts the received value with the private key sk of the user (block 1664). Thus, for example, the personal key client may decrypt $Enc_{pkn}$(ke, ki, Hash(ke, ki)), received from the personal key server with skn to recover the encrypted values (block 1664), such as ke, ki and Hash(ke, ki). That is, ke, ki, Hash(ke, ki)= $Dec_k(Enc_k$(ke, ki, Hash(ke, ki))). The personal key client computes Hash(ke, ki) on the decrypted ke, ki (block 1666) if Hash(ke, ki) is provided in the header compares it with the decrypted value of Hash(ke, ki) to see if they are equal (block 1668). If they are equal, then ke and ki are recovered correctly and they have not been changed.

If the keys have been recovered correctly, the personal key client decrypts the encrypted file $Enc_{ke}$(file) with ke (block 1670). That is, file=$Dec_{ke}(Enc_{ke}$(file)).

If the hash values are not equal, then an error has occurred and the error may be reported to the user (block 1680). Operations would then terminate.

If a MAC is incorporated in the file header, then operations of blocks 1672 through 1676 may be performed. The personal key client generates a MAC (message authentication code) on the decrypted content of the file with ki (block 1672). For example, the MAC may be generated by determining, MAC=Hash(file, ki).

The personal key client checks to see if the MAC that it generated is equal to the MAC that it received in the file header from the file server (block 1676). If they are equal, then the file is recovered correctly and its content has not been changed and the contents may be provided to the user (block 1678). If the MAC values are not equal, then an error has occurred, the error may be reported to the user (block 1680) and operations may terminate.

Turning to FIG. 13, operations for data retrieval by a trusted third party are illustrated. When the trusted third party wants to retrieve and recover a file (fid) associated with a userid id, the trusted third party requests access to a named file (corresponding to a fid) stored on the file server belonging to the file owner whose userid is id by providing, for example, the name of the file to retrieve (block 700) and, possibly, the id of the owner of the file. The personal key client maps the named file to a file ID (fid) (block 702) and creates the tuple (id, fid). The userid utilized to create the tuple may be obtained from the trusted third party or may be stored by the personal key client or the file server. In any event, the personal key client sends an "access encrypted file for trusted third party" request, along with the tuple (id, fid), to the file server (block 704).

Operations of the file server in response to the "access encrypted file for trusted third party request" are illustrated in FIG. 14. As seen in FIG. 14, when the request for access encrypted file for trusted third party is received (block 690), the file server verifies that a directory entry exists for the tuple (id, fid) received in the "access encrypted file" request (block 692). If so, the file server responds by sending the encrypted file, $Enc_{ke}$(file)), and its associated file header to the personal key client (block 696). If a directory entry does not exist for the tuple (id, fid), then the file server sends a "negative" response message to the personal key client (block 694). Note that in the instance where the request is for access by the trusted third party, no ticket is required and no validation of a ticket is performed by the file server. Alternatively, a ticket could be requested by the trusted third party and provided to the file server. In such a case, operations may be performed as described with reference to FIG. 10.

When the personal key client receives the response from the file server, if the response is negative, operations of FIG. 13 may terminate at block 704 and, optionally, the error may be reported to the user. However, if the response provides the encrypted file and file header, the personal key client extracts the encrypted value associated with the trusted third party from the header (block 708), for example, $Enc_{pk}$(ke, ki, Hash(ke, ki)). The extracted encrypted value is decrypted with the trusted third party's private key sk to recover the encryption key utilized to encrypt the file (block 710). For example, in the embodiment illustrated in FIG. 13, the values ke, ki and Hash(ke, ki) may be recovered. That is, ke, ki, Hash(ke, ki)=$Dec_{sk}$ ($Enc_{pk}$(ke, ki, Hash(ke, ki))).

If a hash value is provided, the personal key client computes Hash(ke, ki) on the decrypted ke, ki (block 712) and compares the result with the decrypted value of Hash (ke, ki) to see if they are equal (block 714). If the hash values are equal, then ke and ki are recovered correctly and they have not been changed. The personal key client may then decrypt the encrypted file $Enc_{ke}$(file) with ke (block 716). That is, file=$Dec_{ke}$($Enc_{ke}$(file)).

If the hash values are not equal (block 714), then an error has occurred and this error may, optionally, be reported to the user (block 726) and operations may terminate.

If a MAC is provided in the file header, then the operations of blocks 718 through 722 of FIG. 13 may be performed. The personal key client generates a MAC (message authentication code) on the unencrypted content of the file with ki (block 718). That is, MAC=Hash(file, ki).

The personal key client extracts the MAC from the file header (block 720) and determines if the MAC that it generated is equal to the MAC that it received in the file header from the file server (block 722). If they are equal, then the file is recovered correctly and its content has not been changed. The contents are then provided to the user (block 724). If the MAC values are not equal (block 722), then an error has occurred and this error may, optionally, be reported to the user (block 726) and operations may terminate.

Figure 15:
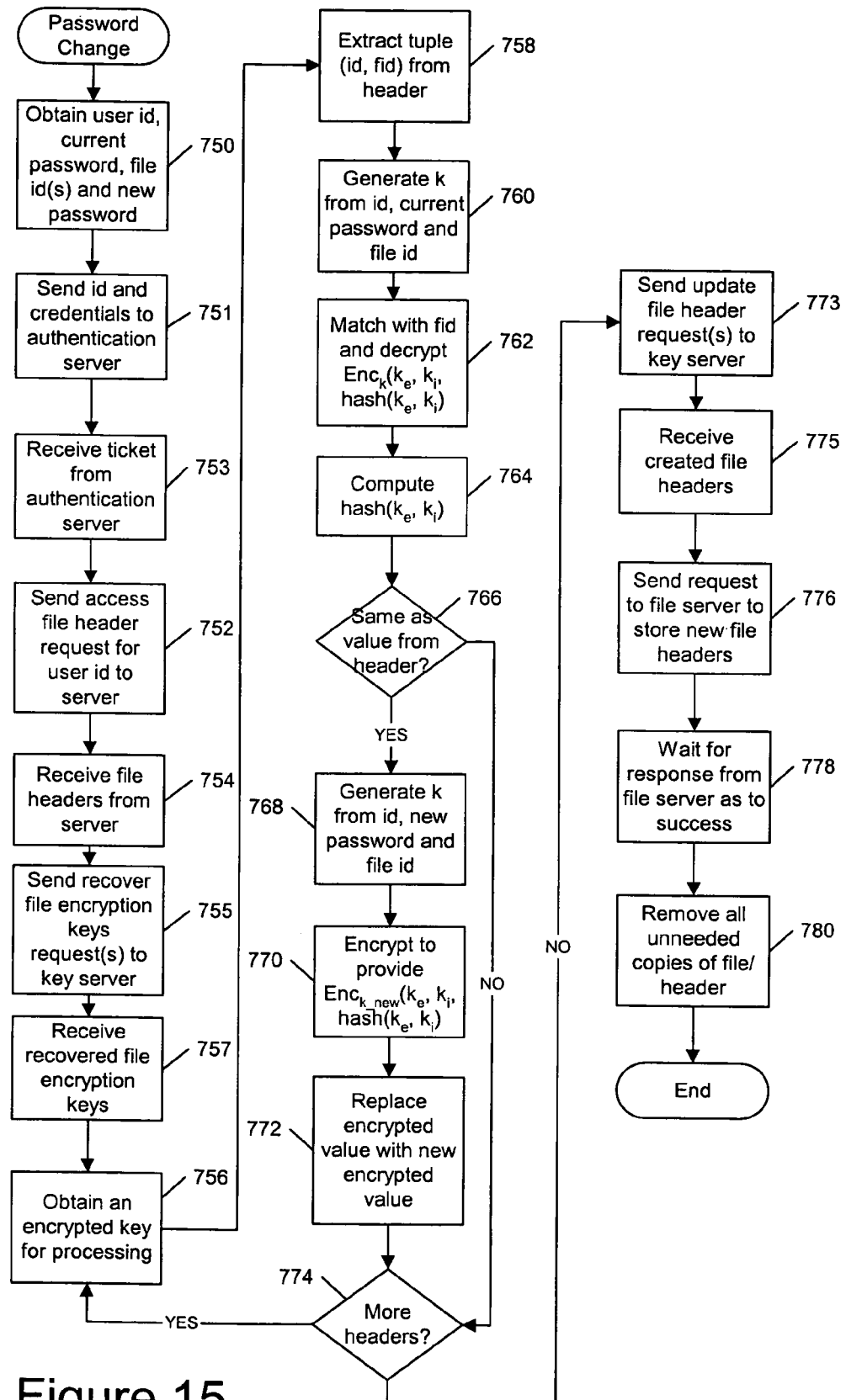
FIG. 15 is a flowchart illustrating operations of a client of an owner of a file for changing a password or passphrase associated with an encrypted file according to embodiments of the present invention.
Figure 16:
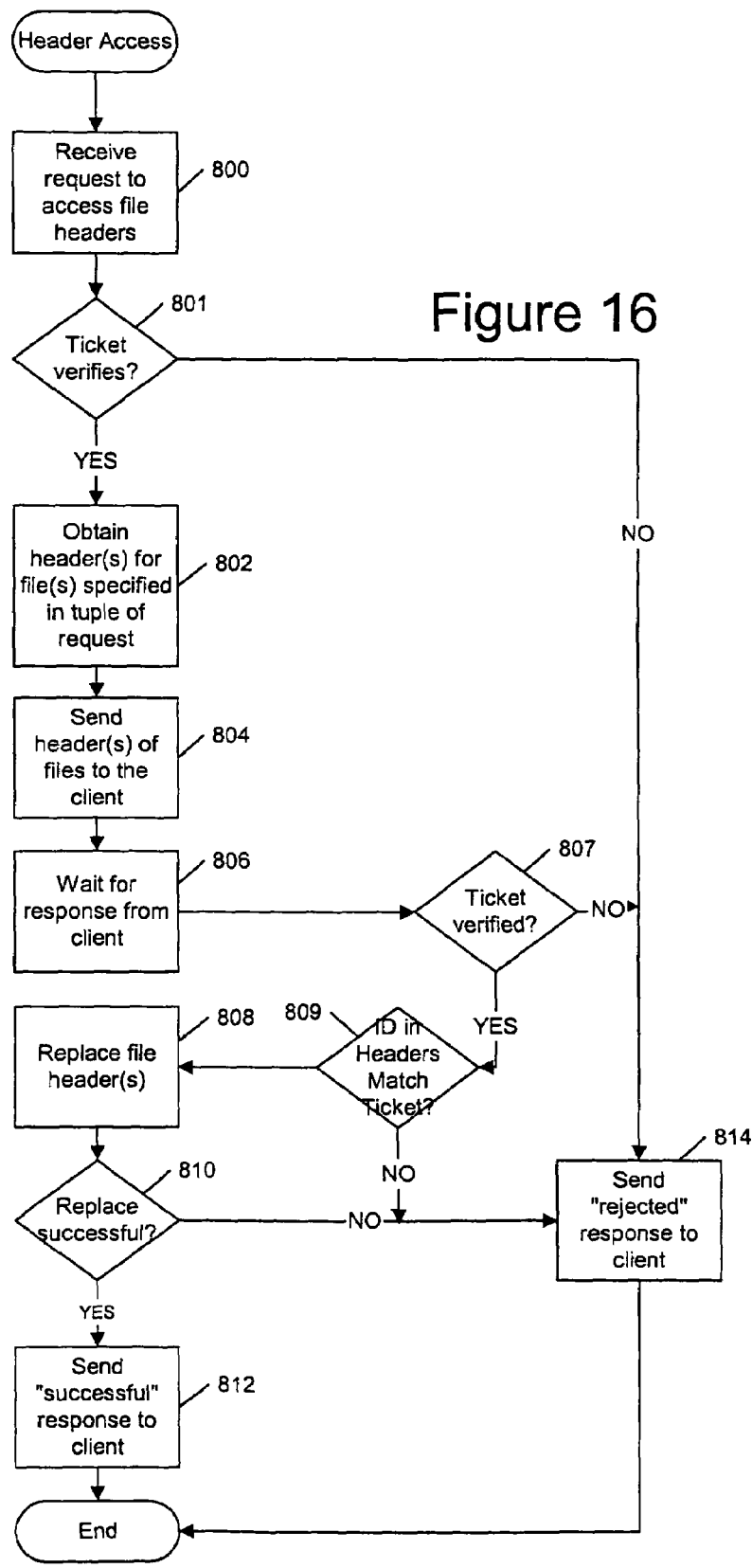
FIG. 16 is a flowchart illustrating operations of a file server in response to a request to access a file header associated with an encrypted file according to embodiments of the present invention.
Figure 17:
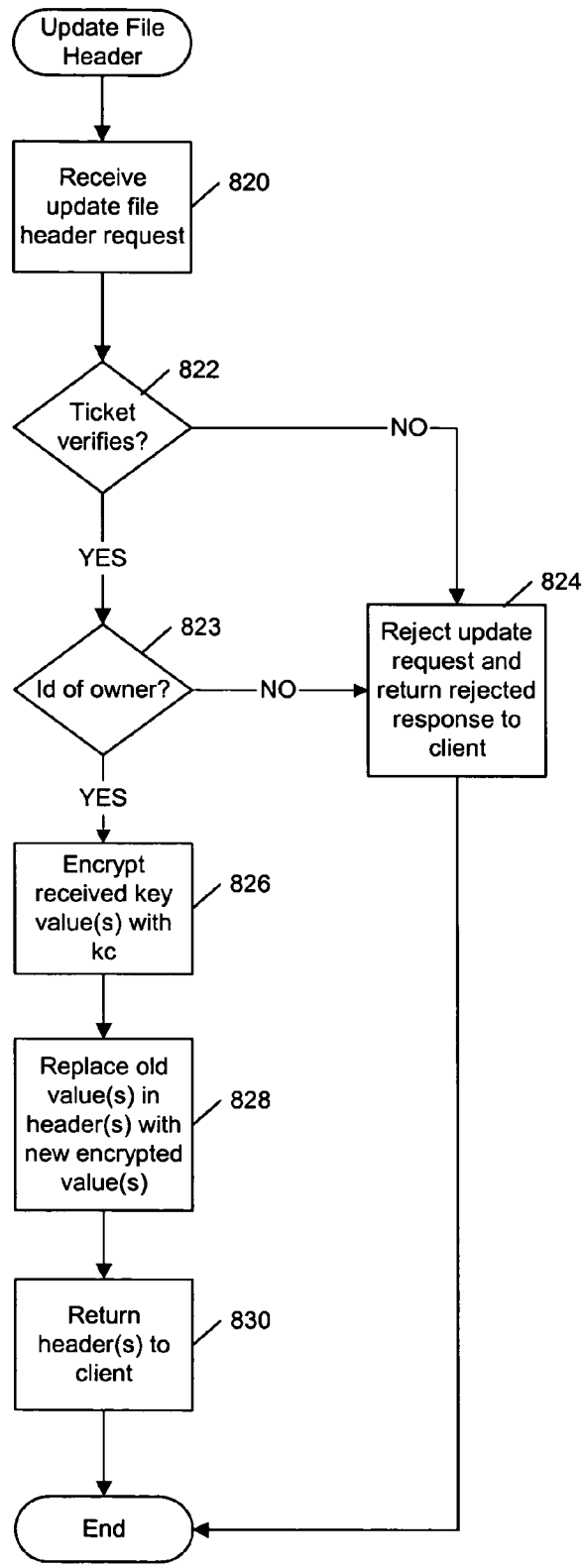
FIG. 17 is a flowchart illustrating operations of a key server in response to a request to update a file header associated with an encrypted file according to embodiments of the present invention.
Figure 18:
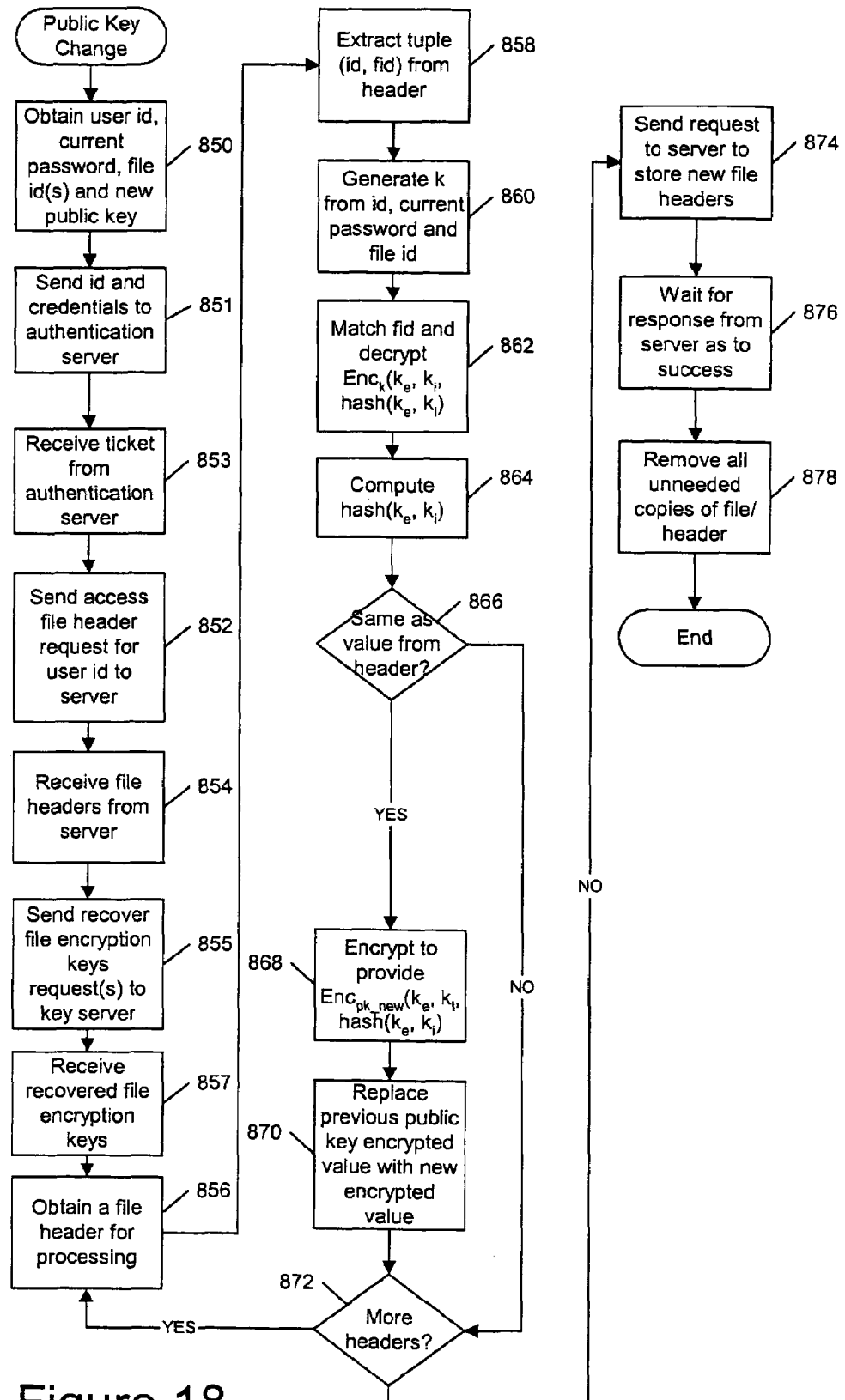
FIG. 18 is a flowchart illustrating operations of a client of an owner of a file for changing a public key of a trusted third party associated with an encrypted file according to embodiments of the present invention.
Figure 19:
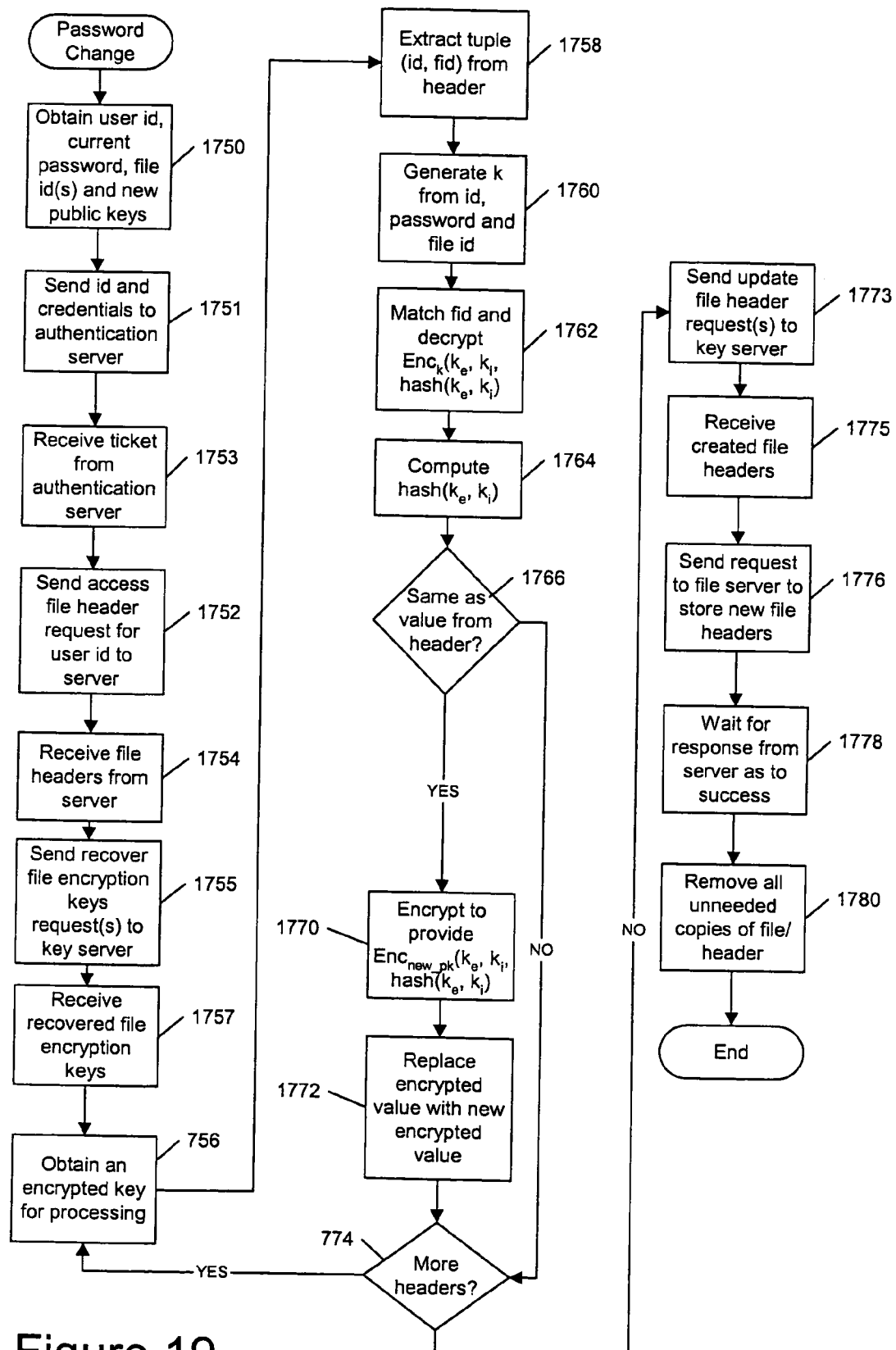
FIG. 19 is a flowchart illustrating operations of a client of an owner of a file for changing a public key of a user(s) associated with an encrypted file according to embodiments of the present invention.

FIGS. 15 through 19 illustrate operations for changing a password or passphrase for a file and for changing the public key of a trusted third party or a user. FIG. 15 illustrates operations carried out by a personal key client to change a password for a file or files. FIG. 16 illustrates operations of a file server for changing the password/passphrase or the public key of a trusted third party or other user for a file or files. FIG. 17 illustrates operations of a personal key server in response to an "update file header" request. FIG. 18 illustrates operations of a personal key client for changing the public key of a trusted third party. FIG. 19 illustrates operations of a personal key client for changing the public key of an other user in embodiments where the encryption key is encrypted with a public key of an other user.

Turning to FIG. 15, when the user wants to change their current (i.e., old) password/passphrase pw to a "new password/passphrase" new pw, the personal key client obtains the user's userid (id), current password/passphrase (pw), and new password/passphrase (new_pw) (block 750) by, for example, the user submitting it to the personal key client. The user may also request a password/passphrase change and may specify which file or files are to be changed. Such a specification may be provided by providing the file name or names, fileid or fileids, by providing a wildcard, such as "*" or combination of wildcards, such as "?", and partial file name or fileids which may be utilized as a criteria for selecting the files for which password changes are to be applied. For example, if the wildcard "*" is specified, all files for a give user will have the password changed. Alternatively, because the key for a given file is based on the files password, the "*" designator could change the password for all files with the password pw.

The personal key client sends id and the user's credentials to the authentication server (block 751) to request authentication of the user as an authorized user. As described above, the credentials may include a representation of the value of pw associated with the file (e.g., a hash value computed on pw) or a different password/passphrase (i.e., different from the value of pw specified block 750).

Operations of the authentication server in response to receiving a request for authentication are seen in FIG. 6. As described above, the authentication server provides a ticket to the personal key client in response to the authentication request which is received by the personal key client (block 753).

The personal key client sends an "access file headers" request along with the tuple defining the userid and the fileids, for example, (id, *), and the received ticket to the file server (block 752).

As illustrated in FIG. 16, in response to the "access file headers" request (block 800), the file server verifies the ticket received from the personal key client (block 801) and, if the ticket is verified, responds by obtaining the file headers corresponding to the provided tuple, for example, (id, *) (block 802). The file server sends the obtained file headers to the personal key client (block 804) and the file server waits for a response from the personal key client (block 806). If the ticket does not verify, then the rejected response is sent to the client (block 814).

Returning to FIG. 15, the personal key client receives the file header(s) from the file server (block 754) and sends a "recover file encryption key" request to the personal key server to recover the file encryption keys for the file headers (block 755) by providing the tuple, for example, (id, *), and the ticket from the authentication server. This operation may be a "batch" operation where all encryption keys are recovered and then processed or it may be performed serially where a file encryption key is processed and then another obtained. Thus, in response to the request to recover file encryption keys the personal key server carries out the operations as illustrated in FIG. 11. Accordingly, in response to the "recover file encryption keys" request, the personal key server compares the requestor's id (from the ticket) against the id of the file owner in its stored access control list. If the requestor's id is not found, then the personal key server rejects the access request. However, if the id is found, and it matches the id of the file owner, then the personal key server extracts an encrypted value $Enc_{kc}$($Enc_k$(ke, ki, Hash (ke, ki))) from each file header, decrypts it with its control key kc, and sends the decrypted values $Enc_k$(ke, ki, Hash(ke, ki)) back to the personal key client in the form of a tuple (fid, $Enc_k$(ke, ki, Hash(ke, ki))). Providing the decrypted $Enc_k$(ke, ki, Hash(ke, ki)) values with the fid values thus allows the personal key client to correctly associate each $Enc_k$(ke, ki, Hash(ke, ki)) value with its corresponding file header.

The personal key client receives the recovered keys (block 757) and obtains a recovered encrypted key for processing (block 756). The personal key client extracts the tuple (id, fid) from the file header (block 758) and generates the key encrypting key k (block 760). That is, $k = Hash(id, pw, fid)$.

The personal key client matches the fid and the encrypted value encrypted with k from the personal key server (block 762), for example, $Enc_k(ke, ki, Hash(ke, ki))$, and decrypts the encrypted value with k (block 762) to recover the encryption key(s), such as ke, ki and Hash(ke, ki). That is, ke, ki, Hash(ke, ki)= $Dec_k(Enc_k(ke, ki, Hash(ke, ki)))$.

If a hash value is present in the encrypted value, the personal key client also computes Hash(ke, ki) using the decrypted ke, ki (block 764) and compares the computed hash value with the decrypted Hash(ke, ki) to determine if they are equal (block 766). If they are equal, then ke and ki are recovered correctly and they have not been changed. If they are not equal, then processing of the current header is concluded and, if more headers are available for processing (block 774), a next header is obtained (block 756) and processing begins again with block 758. Such an error may also generate a message to a user so as to indicate that the password of the file associated with the file header was not changed and/or that an error occurred processing the header file.

If the hash values are equal, the personal key client generates the new key encrypting key new_k (block 768). That is, new_k=Hash(id, new_pw, fid).

The personal key client encrypts the key values, for example, ke, ki and Hash(ke, ki), with new_k (block 770). That is, $Enc_{new\_k}(ke, ki, Hash(ke, ki))$.

The personal key client replaces the current value of the encrypted keys, such as $Enc_k(ke, ki, Hash(ke, ki))$, in the file header with the new value $Enc_{new\_k}(ke, ki, Hash(ke, ki))$ (block 772). At this point, the personal key client may continue processing additional file headers if any remain (block 774).

If no more file headers remain (block 774), the personal key client sends an "update file header" request or requests to the personal key server (block 773) along with the updated file headers and the ticket.

Operations of the personal key server in response to the update file headers request are illustrated in FIG. 17. When the personal key server receives the update the file headers (block 820), the personal key server verifies the ticket received with the request (block 822). If the ticket does not verify, the request is rejected and a rejected response may be sent to the client (block 824). IF the ticket verifies (block 822), the personal key server compares the requestor's id (from the ticket) against the id of the file owner in its access control list (block 823). If the requestor's id is not found, then the personal key server rejects the access request (block 824). However, if the id is found, and it matches the id of the file owner, then for each tuple (fid, $Enc_{k\_new}(ke, ki, Hash(ke, ki)))$ the personal key server encrypts $Enc_{k\_new}(ke, ki, Hash(ke, ki))$ with its control key kc to produce $Enc_{kc}(Enc_{k\_new}(ke, ki, Hash(ke, ki)))$ (block 826) replaces the current value of $Enc_{kc}(Enc_k(ke, ki, Hash(ke, ki)))$ in the file header with the new value $Enc_{kc}(Enc_{k\_new}(ke, ki, Hash(ke, ki)))$ (block 828). The personal key server returns the updated file headers to the personal key client (block 830).

Returning to FIG. 15, the personal key client receives the new file headers from the personal key server (block 773). The personal key client sends a "store updated file headers" request to the file server, along with the updated file headers and the ticket (block 776). The personal key client then waits for a response from the file server (block 778).

Returning to FIG. 16, in response to the "store updated file headers" request (block 806), the file server verifies the validity of the received ticket (block 807) and then verifies that the id in each tuple (id, fid) in each received file header matches the id in the ticket (block 809). The latter check on id is performed to ensure that only valid users, and more particularly only the file owner, can replace file headers associated with his/her encrypted files. If either check fails, a rejected response may be sent to the client (block 814).

If both verifications are passed, the file server replaces the appropriate existing file headers with the received new file headers (block 808). If the replacement of file headers was successful (block 810), the file server sends a response message to the personal key client indicating that the file headers have been replaced in the file server's database (block 812). If the replacement is not successful, the file server may respond by rejecting the request and sending a "rejected" response to the personal key client (block 814). Examples of situations which would result in rejection of an "update file headers" request may include a request to update a file header which does not exist or which has been "locked" by the file server.

In any event, when the personal key client receives the response from the file server, operations continue at block 780 of FIG. 15. The personal key client removes all unneeded copies of the file headers from its memory. As with the systems described above, if the file headers are maintained locally, this may involve removing the file headers from working memory. Thus, at block 780, the personal key client deletes all the information associated with this password/passphrase change operation from its memory/storage (i.e., keys, password/passphrase, encrypted information).

FIG. 18 illustrates operations for changing the public key of a trusted third party. The user or personal key client may be informed when the trusted third party changes its public key. For example a server may send a new certificate, containing the new public key, to the user or personal key client. Alternatively, as noted above, these procedures may be utilized to change the third party which is trusted. Thus, for example, if an employee leaves a company, a new trusted third party could be designated by replacing the public key of the former employee with that of a new employee.

However the notification of a change in a public key occurs, the operations of FIG. 18 may be carried out when the public key of a trusted third party is to be changed from a current (i.e., old) public key pk to a "new public key" new_pk. As seen in FIG. 18, the personal key client obtains a userid (id), current password/passphrase (pw), fileid(s) and new public key new_pk (block 850). Such information may be obtained by the user providing some or all of the information to the personal key client and indicating that a public key update is to be performed. As described above, the files for which the public key update may be performed may be specified in any of the various ways described above.

The personal key client sends id and the user's credentials to the authentication server (block 851) to request authentication of the user as an authorized user. As described above, the credentials may include a representation of the value of pw associated with the file (e.g., a hash value computed on pw) or a different password/passphrase (i.e., different from the value of pw specified block 850).

Operations of the authentication server in response to receiving a request for authentication are seen in FIG. 6. As described above, the authentication server provides a ticket to the personal key client in response to the authentication request which is received by the personal key client (block 853).

The personal key client sends an "access file headers" request along with the tuple, for example, (id, *), and the ticket to the file server (block 852) and waits to receive the file headers. The file server carries out the operations as described above with reference to FIG. 16 and provides the file headers to the personal key client.

Returning to FIG. 18, the personal key client receives the file header(s) from the file server (block 854) and sends a "recover file encryption key" request to the personal key server to recover the file encryption keys for the file headers (block 855) by providing the tuple, for example, (id, *), and the ticket from the authentication server. This operation may be a "batch" operation where all encryption keys are recovered and then processed or it may be performed serially where a file encryption key is processed and then another obtained. Thus, in response to the request to recover file encryption keys the personal key server carries out the operations as illustrated in FIG. 11. Accordingly, in response to the "recover file encryption keys" request, the personal key server compares the requestor's id (from the ticket) against the id of the file owner in its stored access control list. If the requestor's id is not found, then the personal key server rejects the access request. However, if the id is found, and it matches the id of the file owner, then the personal key server extracts an encrypted value $Enc_{kc}(Enc_k(ke, ki, Hash(ke, ki)))$ from each file header, decrypts it with its control key kc, and sends the decrypted values $Enc_k(ke, ki, Hash(ke, ki))$ back to the personal key client in the form of a tuple (fid, $Enc_k(ke, ki, Hash(ke, ki))$). Providing the decrypted $Enc_k(ke, ki, Hash(ke, ki))$ values with the fid values thus allows the personal key client to correctly associate each $Enc_k(ke, ki, Hash(ke, ki))$ value with its corresponding file header.

The personal key client receives the recovered keys (block 857) and obtains a file header for processing (block 856). The personal key client extracts the tuple (id, fid) from the file header (block 858) and generates the key encrypting key k (block 860). That is, k=Hash(id, pw, fid).

The personal key client also matches the fid with a value encrypted with k from the personal key server, for example, $Enc_k(ke, ki, Hash(ke, ki))$, and decrypts it with k to recover the encryption keys (block 862), for example, ke, ki and Hash(ke, ki). That is, ke, ki, Hash(ke, ki)=$Dec_k(Enc_k(ke, ki, Hash(ke, ki)))$.

If a hash value is provided with the encrypted key(s), the personal key client computes Hash(ke, ki) using the decrypted ke, ki (block 864) and compares it with the decrypted Hash(ke, ki) to determine if they are equal (block 866). If they are equal, then ke and ki are recovered correctly and they have not been changed. If they are not equal, then processing of the current header is concluded and, if more headers are available for processing (block 872), a next header is obtained (block 856) and processing begins again with block 858. Such an error may also generate a message to a user so as to indicate that the public key of the trusted third party was not changed and/or that an error occurred processing the header file.

If the hash values are equal, the personal key client encrypts the key values, such as ke, ki and Hash(ke, ki), with new_pk (block 868). That is, $Enc_{new\_pk}(ke, ki, Hash(ke, ki))$.

The personal key client replaces the current value of the encrypted keys, such as $Enc_{pk}(ke, ki, Hash(ke, ki))$, in the file header with the new value of the encrypted keys, such as, $Enc_{new\_pk}(ke, ki, Hash(ke, ki))$ (block 870). If there are more headers to process (block 872), then a next header is obtained (block 856) and processing continues at block 858.

If there are no more headers to process, the personal key client sends a "store updated file headers" request to the file server, along with the updated file headers (block 874). Operations of the file server are carried out as described above with reference to FIG. 16 and the personal key client waits for a response from the file server (block 876). When the personal key client receives the response from the file server, operations continue at block 878 of FIG. 18. The personal key client removes all unneeded copies of the file headers from its memory. As with the systems described above, if the file headers are maintained locally, this may involve removing the file headers from working memory. Thus, at block 878, the personal key client deletes all the information associated with this password/passphrase change operation from its memory/storage (i.e., keys, password/passphrase, encrypted information).

FIG. 19 illustrates operations for changing the public key of one or more "other users" for embodiments of the present invention where the encryption key is encrypted with public key of the other user. The user or personal key client may be informed when the use changes its public key. For example a server may send a new certificate, containing the new public key, to the user or personal key client.

However the notification of a change in a public key occurs, the operations of FIG. 19 may be carried out when the public key of a use is to be changed from a current (i.e., old) public key pki to a "new public key" pki_new. As seen in FIG. 19, the personal key client obtains a userid (id), current password/passphrase (pw), fileid(s) and new public key pki_new (block 1750). Such information may be obtained by the user providing some or all of the information to the personal key client and indicating that a public key update is to be performed. As described above, the files for which the public key update may be performed may be specified in any of the various ways described above.

The personal key client sends id and the user's credentials to the authentication server (block 1751) to request authentication of the user as an authorized user. As described above, the credentials may include a representation of the value of pw associated with the file (e.g., a hash value computed on pw) or a different password/passphrase (i.e., different from the value of pw specified block 1750).

Operations of the authentication server in response to receiving a request for authentication are seen in FIG. 6. As described above, the authentication server provides a ticket to the personal key client in response to the authentication request which is received by the personal key client (block 1753).

The personal key client sends an "access file headers" request along with the tuple defining the userid and the fileids, for example, (id, *), and the received ticket to the file server (block 1752).

Operations of the file server in response to the "access file headers" request are illustrated in FIG. 16. As described above, if the ticket verifies, the file server sends the obtained file headers to the personal key client (block 804) and the file server waits for a response from the personal key client (block 806). If the ticket does not verify, then the rejected response is sent to the client (block 814).

Returning to FIG. 19, the personal key client receives the file header(s) from the file server (block 1754) and sends a "recover file encryption key" request to the personal key server to recover the file encryption keys for the file headers (block 1755) by providing the tuple, for example, (id, *), and the ticket from the authentication server. This operation may be a "batch" operation where all encryption keys are recovered and then processed or it may be performed serially where a file encryption key is processed and then another obtained. Thus, in response to the request to recover file encryption keys the personal key server carries out the operations as illustrated in FIG. 11. Accordingly, in response to the "recover file encryption keys" request, the personal key server compares the requestor's id (from the ticket) against the id of the file owner in its stored access control list. If the requestor's id is not found, then the personal key server rejects the access request. However, if the id is found, and it matches the id of the file owner, then the personal key server extracts an encrypted value $Enc_{kc}(Enc_k(ke, ki, Hash(ke, ki)))$ from each file header, decrypts it with its control key kc, and sends the decrypted values $Enc_k(ke, ki, Hash(ke, ki))$ back to the personal key client in the form of a tuple (fid, $Enc_k(ke, ki, Hash(ke, ki))$). Providing the decrypted $Enc_k(ke, ki, Hash(ke, ki))$ values with the fid values thus allows the personal key client to correctly associate each $Enc_k(ke, ki, Hash(ke, ki))$ value with its corresponding file header.

The personal key client receives the recovered keys (block 1757) and obtains a recovered encrypted key for processing (block 1756). The personal key client extracts the tuple (id, fid) from the file header (block 1758) and generates the key encrypting key k (block 1760). That is, k=Hash (id, pw, fid).

The personal key client matches the fid and the encrypted value encrypted with k from the personal key server (block 1762), for example, $Enc_k(ke, ki, Hash(ke, ki))$, and decrypts the encrypted value with k (block 1762) to recover the encryption key(s), such as ke, ki and Hash(ke, ki). That is, ke, ki, Hash(ke, ki)= $Dec_k(Enc_k(ke, ki, Hash(ke, ki)))$.

If a hash value is present in the encrypted value, the personal key client also computes Hash(ke, ki) using the decrypted ke, ki (block 1764) and compares the computed hash value with the decrypted Hash(ke, ki) to determine if they are equal (block 1766). If they are equal, then ke and ki are recovered correctly and they have not been changed. If they are not equal, then processing of the current header is concluded and, if more headers are available for processing (block 1774), a next header is obtained (block 1756) and processing begins again with block 1758. Such an error may also generate a message to a user so as to indicate that the password of the file associated with the file header was not changed and/or that an error occurred processing the header file.

The personal key client encrypts the key values, for example, ke, ki and Hash(ke, ki), with pki_new (block 1770). That is, $Enc_{pki\_new}(ke, ki, Hash(ke, ki))$.

The personal key client replaces the current value of the encrypted keys for the user, such as $Enc_{pki}(ke, ki, Hash(ke, ki))$, in the file header with the new value $Enc_{pki\_new}(ke, ki, Hash (ke, ki))$ (block 1772). At this point, the personal key client may continue processing additional file headers if any remain (block 1774).

If no more file headers remain (block 1774), the personal key client sends an "update file header" request or requests to the personal key server (block 1773) along with the updated file headers and the ticket.

Operations of the personal key server in response to the update file headers request are decribed above with reference to FIG. 17. As described above, for each tuple (fid, $Enc_{pki\_new}(ke, ki, Hash(ke, ki))$) the personal key server encrypts $Enc_{pki\_new}(ke, ki, Hash(ke, ki))$ with its control key kc to produce $Enc_{kc}(Enc_{pki\_new}(ke, ki, Hash(ke, ki)))$, replaces the current value of $Enc_{kc}(Enc_{pki}(ke, ki, Hash(ke, ki)))$ in the file header with the new value $Enc_{kc}(Enc_{pki\_new}(ke, ki, Hash(ke, ki)))$ and returns the updated file headers to the personal key client.

Returning to FIG. 19, the personal key client receives the new file headers from the personal key server (block 1775). The personal key client sends a "store updated file headers" request to the file server, along with the updated file headers and the ticket (block 1776). The personal key client then waits for a response from the file server (block 1778).

Operations of the file server are then carried out as described above with reference to FIG. 16. If the replacement of file headers was successful, the file server sends a response message to the personal key client indicating that the file headers have been replaced in the file server's database. When the personal key client receives the response from the file server, operations continue at block 1780 of FIG. 19. The personal key client removes all unneeded copies of the file headers from its memory. As with the systems described above, if the file headers are maintained locally, this may involve removing the file headers from working memory. Thus, at block 1780, the personal key client deletes all the information associated with this password/passphrase change operation from its memory/storage (i.e., keys, password/passphrase, encrypted information).

While the operations of FIGS. 15 through 19 are illustrated as being performed in a batch operation, such operations could also be performed on a header by header basis. In such embodiments, the each header to be changed could be obtained, modified and then stored on the file server. Thus, the present invention should not be construed as limited to the particular operations illustrated in FIGS. 15 through 19.

As will be understood by those of skill in the art in light of the present disclosure, messages sent between the personal key client and the personal key server may be encrypted in session keys. This may ensure that the file encryption keys, which in some cases might otherwise appear in the clear, are encrypted under a session key, thereby ensuring that the file encryption keys are protected on the communication path between the personal key client and the personal key server. If the network authentication mechanism is based on Kerberos, then the needed session encryption keys can be provided by Kerberos. However, any suitable mechanism for providing secure communications may be utilized in certain embodiments of the present invention.

In addition, cryptography could be used between the personal key client and the personal key server to protect the integrity of messages sent from one party to the other. In a like manner, cryptography could be used between the personal key client and the file server to protect the integrity, and possibly the secrecy, of messages sent from party to the other.

The flowcharts and block diagrams of FIGS. 1 through 19 illustrate the architecture, functionality, and operation of possible implementations of systems, methods and computer program products for securing stored digital data. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for controlling access to digital data of a file, the system comprising:
   a file server configured to store an encrypted file and a file header corresponding to the digital data of the file and containing an encryption key encrypted with both a personal key of an owner of the file and a control key;
   a personal key server configured to receive a header associated with a file, the file header containing an encryption key encrypted with a personal key and encrypt the encrypted encryption key with a control key to provide the file header containing an encryption key encrypted with both a personal key and a control key; and
   a personal key client configured to generate the encryption key, encrypt the digital data of the file with the encryption key, generate the personal key from a password associated with the file, encrypt the encryption key with the personal key, incorporate the encrypted encryption key in a file header associated with the file and provide the file header with the encryption key encrypted with the personal key to the personal key server, receive the file header from the personal key server and provide the file header received from the personal key server to the file server.

2. A system according to claim 1, further comprising:
   an authentication server configured to receive access requests from the personal key client, determine if the access request is authorized and provide a ticket to the personal key client if the access request is authorized;
   wherein the personal key client is further configured to request access from the authentication server, receive the ticket from the authentication server and provide the ticket along with the file header to the personal key server and along with the encrypted file and the file header to the file server;
   wherein the personal key server is further configured to receive the ticket from the personal key client, determine the validity of the ticket and reject requests from the personal key client if the ticket is invalid; and
   wherein the file server is further configured to receive the ticket from the personal key client, determine the validity of the ticket and reject requests from the personal key client if the ticket is invalid.

3. A system according to claim 1, wherein the personal key client is further configured to receive a request to access the file by the file owner, request the file and the associated file header from the file server, extract the encryption key encrypted with the personal key and the control key from the file header, request that the personal key server recover the encrypted encryption key from the file header, receive the recovered encrypted encryption key from the personal key server, generate the personal key from the password, decrypt the recovered encrypted encryption key with the personal key to recover the encryption key and decrypt the encrypted digital data with the recovered encryption key;
   wherein the file server is configured to provide the file and the associated file header in to the personal key client in response to the request for the file and the associated file header; and
   wherein the personal key server is configured to receive a request from the personal key client to recover the encrypted encryption key containing the encryption key encrypted with the personal key and the control key, decrypt the encryption key encrypted with the personal key and the control key with the control key and return the encryption key encrypted with the personal key to the personal key client.

4. A system according to 1, wherein the personal key client is further configured to request the file header associated with the file from the file server, receive the file header from the file server, extract the encryption key encrypted with the personal key and the control key, request that the personal key server recover the encrypted encryption key, receive the recovered encrypted encryption key from the personal key server, generate the personal key, decrypt the recovered encrypted encryption key with the personal key to provide a recovered encryption key, obtain a new password associated with the file, generate a new personal key based on the new password, encrypt the recovered encryption key to provide a new personal key encrypted encryption key, request an update of the file header by the personal key server to incorporate the new personal key encrypted encryption key, receive an updated file header from the personal key server and provide the updated file header to the file server;
   wherein the file server is configured to receive the request for the file header from the personal key client, provide the file header to the personal key client, receive the updated file header from the personal key client and store the received file header; and
   wherein the personal key server is configured to receive the request to recover the encrypted file encryption key, decrypt the file encryption key encrypted with the personal key and the control key to provide the recovered encrypted encryption key, provide the recovered encrypted encryption key to the personal key client, receive the request to update the file header to incorporate the new personal key encrypted encryption key, encrypt the new personal key encrypted encryption key with the control key, incorporate the encryption key encrypted with the new personal key and the control key in the file header to provide an updated file header and return the updated file header to the personal key client.

5. A system according to claim 4, wherein the personal key client is further configured to include in the request to update of the file header by the personal key server an identification of a user requesting to update the file header; and
   wherein the personal key server if further configured to compare the identification of the user requesting to update the file header with a list of users authorized to access the file and reject the request if the user requesting to update the file header is not identified in the list of users authorized to access the file as the owner of the file.

6. A system according to claim 1, wherein the personal key client is further configured to encrypt the encryption key with a public key of a trusted third party and incorporate the encryption key encrypted with the public key of a trusted third party into the file header.

7. A system according to claim 6, wherein the personal key client is further configured to receive a request by the trusted third party to access the file, request access to the file by the trusted third party from the file server, receive the encrypted file and the file header from the file server, extract the encryption key encrypted with the public key of the trusted third party from the received file header, obtain the private key of the trusted third party, decrypt the extracted encryption key encrypted with the public key of the trusted third party to recover the encryption key and decrypt the encrypted file with the recovered encryption key; and wherein the file server is further configured to receive the request for access to the file by the trusted third party and provide the encrypted file and the associated file header to the personal key client in response to receiving the request for access to the file by the trusted third party.

8. A system according to claim 6, wherein the personal key client is further configured to request the file header associated with the file from the file server, receive the file header from the file server, extract the encryption key encrypted with the personal key and the control key, request that the personal key server recover the encrypted encryption key, receive the recovered encrypted encryption key from the personal key server, generate the personal key, decrypt the recovered encrypted encryption key with the personal key, obtain a new public key associated with the trusted third party to provide a new public key encrypted encryption key, incorporate the new public key encryption key in the file header and provide the file header to the file server;

wherein the file server is configured to receive the request for the file header from the personal key client, provide the file header to the personal key client, receive the file header from the personal key client and store the received file header; and wherein the personal key server is configured to receive the request to recover the encrypted file encryption key, decrypt the file encryption key encrypted with the personal key and the control key to provide the recovered encrypted encryption key and provide the recovered encrypted encryption key to the personal key client.

9. A system according to claim 1, wherein the personal key client is further configured to incorporate the encryption key unencrypted in the file header and to provide the personal key server with a list of users authorized to have access to the file; and wherein the personal key server is further configured to encrypt the unencrypted encryption key with the control key, and incorporate the unencrypted encryption key encrypted with the control key in the file header and return the file header incorporating the encryption key encrypted with the control key to the personal key client.

10. A system according to claim 9, wherein the personal key client is further configured to receive a request to access the file by a user other than the file owner, request the file and the associated file header from the file server, extract the encryption key encrypted with only the control key from the file header, request that the personal key server recover the encryption key from the file header, receive the recovered encryption key from the personal key server and decrypt the encrypted digital data with the recovered encryption key;

wherein the file server is configured to provide the file and the associated file header in to the personal key client in response to the request for the file and the associated file header; and wherein the personal key server is configured to receive a request from the personal key client to recover the encryption key in response to a request by a user other than the owner, the request from the personal key client containing the encryption key encrypted with the control key, decrypt the encryption key encrypted with the control key with the control key and return the encryption key to the personal key client.

11. A system according to claim 10 wherein the personal key client is further configured to include in the request to recover the encryption key an identification of the user requesting to access the file; and wherein the personal key server if further configured to compare the identification of the user requesting to access the file with the list of users authorized to access the file and reject the request if the user requesting to access the file is not identified in the list of users authorized to access the file.

12. A system according to claim 1, wherein the personal key client is further configured to encrypt the encryption key with a public key of each user other than the owner which are authorized to access the file to provide a public key encrypted encryption key corresponding to each user other than the owner, incorporate the public key encrypted encryption key corresponding to each user other than the owner of the file in the file header and to provide the personal key server with a list containing each user authorized to have access to the file; and wherein the personal key server is further configured to encrypt each public key encrypted encryption key with the control key, and incorporate each public key encrypted encryption key encrypted with the control key in the file header and return the file header incorporating each public key encrypted encryption key encrypted with the control key to the personal key client.

13. A system according to 12, wherein the personal key client is further configured to request the file header associated with the file from the file server, receive the file header from the file server, extract the encryption key encrypted with the personal key and the control key, request that the personal key server recover the encrypted encryption key, receive the recovered encrypted encryption key from the personal key server, generate the personal key, decrypt the recovered encrypted encryption key with the personal key to provide a recovered encryption key, obtain a new public key associated with a user other than the owner of the file, encrypt the recovered encryption key with the new public key to provide a new public key encrypted encryption key, request an update of the file header by the personal key server to incorporate the new public key encrypted encryption key, receive an updated file header from the personal key server and provide the updated file header to the file server;

wherein the file server is configured to receive the request for the file header from the personal key client, provide the file header to the personal key client, receive the updated file header from the personal key client and store the received file header; and wherein the personal key server is configured to receive the request to recover the encrypted file encryption key, decrypt the file encryption key encrypted with the personal key and the control key to provide the recovered encrypted encryption key, provide the recovered encrypted encryption key to the personal key client, receive the request to update the file header to incorporate the new public key encrypted encryption key, encrypt the new public key encrypted encryption key with the control key, incorporate the encryption key encrypted with the new public key and the control key in the file header to provide an updated file header and return the updated file header to the personal key client.

14. A system according to claim 12 wherein the personal key client is further configured to include in the request to update of the file header by the personal key server to incorporate the new public key encrypted encryption key an identification of a user requesting to update the file header; and wherein the personal key server is further configured to compare the identification of the user requesting to update the file header with the list of users authorized to access the file and reject the request if the user requesting to update the file header is not identified in the list of users authorized to access the file as the owner of the file.

15. A system according to claim 12 wherein the personal key client is further configured to receive a request from a user other than the owner to access the file, request the file and the associated file header from the file server, extract the public key encrypted encryption key encrypted with the control key corresponding to the user requesting access to the file from the file header, request that the personal key server recover the public key encrypted encryption key corresponding to the user requesting access to the file from the file header, receive the recovered public key encrypted encryption key from the personal key server, obtain a private key associated with the user requesting access to the file, decrypt the recovered encrypted encryption key with the private key to recover the encryption key and decrypt the encrypted digital data with the recovered encryption key;

wherein the file server is configured to provide the file and the associated file header in to the personal key client in response to the request for the file and the associated file header; and wherein the personal key server is configured to receive a request from the personal key client to recover the public key encrypted encryption key containing the public key encrypted encryption key encrypted with the control key corresponding to the user requesting access to the file, decrypt the public key encrypted encryption key encrypted the control key with the control key and return the public key encrypted encryption key corresponding to the user requesting the file to the personal key client.

16. A system according to claim 15, wherein the personal key client is further configured to include in the request to recover the public key encrypted encryption key corresponding to the user requesting to access the file an identification of the user requesting to access the file; and wherein the personal key server is further configured to compare the identification of the user requesting to access the file with the list of users authorized to access the file and reject the request if the user requesting to access the file is not identified in the list of users authorized to access the file.

17. A method for controlling access to digital data of a file utilizing a file system including a personal key client, wherein the personal key client carries out the steps of:

generating an encryption key;

encrypting the digital data of the file with the encryption key;

obtaining a password associated with the file;

generating a personal key from the password associated with the file;

encrypting the encryption key with the personal key;

incorporating in a file header the encryption key encrypted with the personal key;

requesting encryption of the file header with a control key;

receiving the file header encrypted with the control key;

associating the file header with the file; and storing the file header and the encrypted digital data of the file at a file server.

18. A method according to claim 17, further comprising:

receiving access requests from a user to access the file system;

determining if the access request is authorized;

providing a ticket utilized to access the file system if the access request is authorized; and utilizing the ticket to perform file storage, access and administrative operations.

19. A method according to claim 17, further comprising the steps of:

receiving a request to access the file by the file owner;

requesting the file and the associated file header from the file server;

extracting the encryption key encrypted with the personal key and the control key from the file header;

requesting recovery of the encrypted encryption key from the file header;

receiving the recovered encrypted encryption key;

obtaining a password to decrypt the file;

generating the personal key from the obtained password;

decrypting the recovered encrypted encryption key with the personal key to recover the encryption key; and decrypting the encrypted digital data with the recovered encryption key.

20. A method according to 17, further comprising the steps of:

requesting the file header associated with the file from the file server;

receiving the file header from the file server;

extracting the encryption key encrypted with the personal key and the control key;

requesting recovery of the encrypted encryption key;

receiving the recovered encrypted encryption key;

generating the personal key;

decrypting the recovered encrypted encryption key with the personal key to provide a recovered encryption key;

obtaining a new password associated with the file;

generating a new personal key based on the new password;

encrypting the recovered encryption key to provide a new personal key encrypted encryption key;

requesting an update of the file header to incorporate the new personal key encrypted encryption key;

receiving an updated file header from the personal key server; and providing the updated file header to the file server.

21. A method according to claim 17, further comprising:

encrypting the encryption key with a public key of a trusted third party;

incorporating the encryption key encrypted with the public key of a trusted third party into the received file header to provide a new file header; and storing the new file header at the file server.

22. A method according to claim 21, further comprising:
  receiving a request by the trusted third party to access the file;
  requesting access to the file by the trusted third party from the file server;
  receiving the encrypted file and the file header from the file server;
  extracting the encryption key encrypted with the public key of the trusted third party from the received file header;
  obtaining the private key of the trusted third party;
  decrypting the extracted encryption key encrypted with the public key of the trusted third party to recover the encryption key; and
  decrypting the encrypted file with the recovered encryption key.

23. A method according to claim 21, further comprising:
  requesting the file header associated with the file from the file server;
  receiving the file header from the file server;
  extracting the encryption key encrypted with the personal key and the control key;
  requesting recovery of the encrypted encryption key;
  receiving the recovered encrypted encryption key;
  generating the personal key;
  decrypting the recovered encrypted encryption key with the personal key to provide a recovered encryption key;
  obtaining a new public key associated with the trusted third party;
  encrypting the recovered encryption key with the new public key to provide a new public key encrypted encryption key;
  incorporating the new public key encryption key in the file header to provide an updated file header; and
  providing the updated file header to the file server.

24. A method according to claim 17, wherein the step of requesting encryption of the file header with a control key is preceded by the step of incorporating the encryption key unencrypted in the file header; and the method further comprising:
  providing a list of users authorized to have access to the file.

25. A method according to claim 24, further comprising:
  receiving a request to access the file by a user other than the file owner;
  requesting the file and the associated file header from the file server;
  extracting the encryption key encrypted with only a control key from the file header;
  requesting recovery of the encryption key from the file header;
  receiving the recovered encryption key; and
  decrypting the encrypted digital data with the recovered encryption key.

26. A method according to claim 17, wherein the step of requesting encryption of the file header with a control key is preceded by the steps of:
  encrypting the encryption key with a public key of each user other than the owner which is authorized to access the file to provide a public key encrypted encryption key corresponding to each user other than the owner;
  incorporating the public key encrypted encryption key corresponding to each user other than the owner of the file in the file header; and the method further comprising:
  providing a list containing each user authorized to have access to the file.

27. A method according to 26, further comprising:
  requesting the file header associated with the file from the file server;
  receiving the file header from the file server;
  extracting the encryption key encrypted with the personal key and the control key from the received file header;
  requesting recovery of the encrypted encryption key;
  receiving the recovered encrypted encryption key;
  generating the personal key;
  decrypting the recovered encrypted encryption key with the personal key to provide a recovered encryption key;
  obtaining a new public key associated with a user other than the owner of the file;
  encrypting the recovered encryption key with the new public key to provide a new public key encrypted encryption key;
  requesting an update of the file header to incorporate the new public key encrypted encryption key;
  receiving an updated file header; and
  providing the updated file header to the file server.

28. A method according to claim 26 further comprising:
  receiving a request from a user other than the owner to access the file;
  requesting the file and the associated file header from the file server;
  receiving the encrypted file and the file header form the file server;
  extracting the public key encrypted encryption key encrypted with the control key corresponding to the user requesting access to the file from the file header;
  requesting recovery of the public key encrypted encryption key corresponding to the user requesting access to the file from the file header;
  receiving the recovered public key encrypted encryption key;
  obtaining a private key associated with the user requesting access to the file;
  decrypting the recovered encrypted encryption key with the private key to recover the encryption key; and
  decrypting the encrypted digital data with the recovered encryption key.

29. A method for controlling access to digital data of a file in a file system having a personal key server, the personal key server carrying out the steps of:
  receiving a request from a requestor to create a file header associated with the file, the request containing an encryption key utilized to encrypt the digital data, the encryption key being encrypted with a personal key;
  encrypting the encrypted encryption key with a control key to provide the file header containing an encryption key encrypted with both a personal key and a control key; and
  returning the file header to the requester.

30. A method according to claim 29, wherein the request further includes an authentication ticket, the method further comprising the steps of:
  determining the validity of the authentication ticket; and
  rejecting the request if the authentication ticket is invalid.

31. A method according to claim 29, further comprising:
  receiving a request from the personal key client to recover the encrypted encryption key containing the encryption key encrypted with the personal key and the control key;
  decrypting the encryption key encrypted with the personal key and the control key with the control key;
  returning the encryption key encrypted with the personal key.

32. A method according to 29, further comprising:
   receiving a request to update the file header to incorporate an encryption key encrypted with a new encryption key;
   encrypting the encryption key encrypted with the new encryption key with the control key to provide a control key encrypted new encryption key encrypted encryption key;
   incorporating the control key encrypted new encryption key encrypted encryption key in the file header to provide an updated file header; and
   returning the updated file header.

33. A method according to claim 32, wherein the request to update of the file header to incorporate the encryption key encrypted with a new encryption key includes an identification of a user requesting to update the file header, the method further comprising:
   comparing the identification of the user requesting to update the file header with a list of users authorized to access the file; and
   rejecting the request if the user requesting to update the file header is not identified in the list of users authorized to access the file as the owner of the file.

34. A method according to claim 29, wherein the request from a requestor to create a file header associated with the file, further contains an unencrypted encryption key associated with users authorized to access the file, the method further comprising:
   encrypting the unencrypted encryption key with the control key;
   incorporating the unencrypted encryption key encrypted with the control key in the file header; and returning the file header incorporating the encryption key encrypted with the control key.

35. A method according to claim 34, further comprising:
   receiving a request to recover the encryption key in response to a request by a user other than an owner of the file containing the encryption key encrypted with the control key;
   decrypting the encryption key encrypted with the control key with the control key; and
   returning the encryption key.

36. A method according to claim 35 wherein the request to recover the encryption key includes an identification of the user requesting to access the file, the method further comprising:
   comparing the identification of the user requesting to access the file with a list of users authorized to access the file; and
   rejecting the request if the user requesting to access the file is not identified in the list of users authorized to access the file.

37. A method according to claim 29, wherein the request to create a file header associated with the file includes a public key encrypted encryption key corresponding to each user authorized to access the file other than an owner of the file and a list containing each user authorized to have access to the file, the method further comprising:
   encrypting each public key encrypted encryption key with the control key;
   incorporating each public key encrypted encryption key encrypted with the control key in the file header;
   returning the file header incorporating each public key encrypted encryption key encrypted with the control key.

38. A method according to claim 37, further comprising the step of creating an access control list from the list provided with the request.

39. A method according to claim 37, further comprising:
   receiving a request to recover the public key encrypted encryption key containing the public key encrypted encryption key encrypted with the control key corresponding to a user requesting access to the file;
   decrypting the public key encrypted encryption key encrypted the control key with the control key; and
   returning the public key encrypted encryption key corresponding to the user requesting the file.

40. A method according to claim 39, further comprising:
   comparing the identification of the user requesting to access the file with the list of users authorized to access the file; and
   rejecting the request if the user requesting to access the file is not identified in the list of users authorized to access the file.

41. A personal key client for controlling access to digital data of a file utilizing a file system, comprising:
   means for generating an encryption key;
   means for encrypting the digital data of the file with the encryption key;
   means for obtaining a password associated with the file;
   means for generating a personal key from the password associated with the file;
   means for encrypting the encryption key with the personal key;
   means for incorporating in a file header the encryption key encrypted with the personal key;
   means for requesting encryption of the file header with a control key;
   means for receiving the file header encrypted with the control key;
   means for associating the file header with the file; and
   means for storing the file header and the encrypted digital data of the file at a file server.

42. A personal key client according to claim 41, further comprising:
   means for receiving access requests from a user to access the file system;
   means for determining if the access request is authorized;
   means for providing a ticket utilized to access the file system if the access request is authorized; and
   means for utilizing the ticket to perform file storage, access and administrative operations.

43. A personal key client according to claim 41, further comprising:
   means for receiving a request to access the file by the file owner;
   means for requesting the file and the associated file header from the file server;
   means for extracting the encryption key encrypted with the personal key and the control key from the file header;
   means for requesting recovery of the encrypted encryption key from the file header;
   means for receiving the recovered encrypted encryption key;
   means for obtaining a password to decrypt the file;
   means for generating the personal key from the obtained password;

means for decrypting the recovered encrypted encryption key with the personal key to recover the encryption key; and means for decrypting the encrypted digital data with the recovered encryption key.

44. A personal key client according to 41, further comprising:

means for requesting the file header associated with the file from the file server;

means for receiving the file header from the file server;

means for extracting the encryption key encrypted with the personal key and the control key;

means for requesting recovery of the encrypted encryption key;

means for receiving the recovered encrypted encryption key;

means for generating the personal key;

means for decrypting the recovered encrypted encryption key with the personal key to provide a recovered encryption key;

means for obtaining a new password associated with the file;

means for generating a new personal key based on the new password;

means for encrypting the recovered encryption key to provide a new personal key encrypted encryption key;

means for requesting an update of the file header to incorporate the new personal key encrypted encryption key;

means for receiving an updated file header from the personal key server; and means for providing the updated file header to the file server.

45. A personal key client according to claim 41, further comprising:

means for encrypting the encryption key with a public key of a trusted third party;

means for incorporating the encryption key encrypted with the public key of a trusted third party into the received file header to provide a new file header; and means for storing the new file header at the file server.

46. A personal key client according to claim 45, further comprising:

means for receiving a request by the trusted third party to access the file;

means for requesting access to the file by the trusted third party from the file server;

means for receiving the encrypted file and the file header from the file server;

means for extracting the encryption key encrypted with the public key of the trusted third party from the received file header;

means for obtaining the private key of the trusted third party;

means for decrypting the extracted encryption key encrypted with the public key of the trusted third party to recover the encryption key; and means for decrypting the encrypted file with the recovered encryption key.

47. A personal key client according to claim 45, further comprising:

means for requesting the file header associated with the file from the file server;

means for receiving the file header from the file server;

means for extracting the encryption key encrypted with the personal key and the control key;

means for requesting recovery of the encrypted encryption key;

means for receiving the recovered encrypted encryption key;

means for generating the personal key;

means for decrypting the recovered encrypted encryption key with the personal key to provide a recovered encryption key;

means for obtaining a new public key associated with the trusted third party;

means for encrypting the recovered encryption key with the new public key to provide a new public key encrypted encryption key;

means for incorporating the new public key encryption key in the file header to provide an updated file header; and means for providing the updated file header to the file server.

48. A personal key client according to claim 41, further comprising:

means for incorporating the encryption key unencrypted in the file header; and means for providing a list of users authorized to have access to the file.

49. A personal key client according to claim 48, further comprising:

means for receiving a request to access the file by a user other than the file owner;

means for requesting the file and the associated file header from the file server;

means for extracting the encryption key encrypted with only a control key from the file header;

means for requesting recovery of the encryption key from the file header;

means for receiving the recovered encryption key; and means for decrypting the encrypted digital data with the recovered encryption key.

50. A personal key client according to claim 41, further comprising:

means for encrypting the encryption key with a public key of each user other than the owner which is authorized to access the file to provide a public key encrypted encryption key corresponding to each user other than the owner;

means for incorporating the public key encrypted encryption key corresponding to each user other than the owner of the file in the file header; and means for providing a list containing each user authorized to have access to the file.

51. A personal key client according to 50, further comprising:

means for requesting the file header associated with the file from the file server;

means for receiving the file header from the file server;

means for extracting the encryption key encrypted with the personal key and the control key from the received file header;

means for requesting recovery of the encrypted encryption key;

means for receiving the recovered encrypted encryption key;

means for generating the personal key;

means for decrypting the recovered encrypted encryption key with the personal key to provide a recovered encryption key;

means for obtaining a new public key associated with a user other than the owner of the file;

means for encrypting the recovered encryption key with the new public key to provide a new public key encrypted encryption key;

means for requesting an update of the file header to incorporate the new public key encrypted encryption key;

means for receiving an updated file header; and means for providing the updated file header to the file server.

52. A personal key client according to claim 50 further comprising:

means for receiving a request from a user other than the owner to access the file;

means for requesting the file and the associated file header from the file server;

means for receiving the encrypted file and the file header form the file server;

means for extracting the public key encrypted encryption key encrypted with the control key corresponding to the user requesting access to the file from the file header;

means for requesting recovery of the public key encrypted encryption key corresponding to the user requesting access to the file from the file header;

means for receiving the recovered public key encrypted encryption key;

means for obtaining a private key associated with the user requesting access to the file;

means for decrypting the recovered encrypted encryption key with the private key to recover the encryption key; and means for decrypting the encrypted digital data with the recovered encryption key.

53. A personal key server for controlling access to digital data of a file in a file system having a personal key server, comprising:

means for receiving a request from a requestor to create a file header associated with the file, the request containing an encryption key utilized to encrypt the digital data, the encryption key being encrypted with a personal key;

means for encrypting the encrypted encryption key with a control key to provide the file header containing an encryption key encrypted with both a personal key and a control key; and means for returning the file header to the requestor.

54. A personal key server according to claim 53, wherein the request further includes an authentication ticket, the personal key server further comprising:

means for determining the validity of the authentication ticket; and means for rejecting the request if the authentication ticket is invalid.

55. A personal key server according to claim 53, further comprising:

means for receiving a request from the personal key client to recover the encrypted encryption key containing the encryption key encrypted with the personal key and the control key;

means for decrypting the encryption key encrypted with the personal key and the control key with the control key;

means for returning the encryption key encrypted with the personal key.

56. A personal key server according to 53, further comprising:

means for receiving a request to update the file header to incorporate an encryption key encrypted with a new encryption key;

means for encrypting the encryption key encrypted with the new encryption key with the control key to provide a control key encrypted new encryption key encrypted encryption key;

means for incorporating the control key encrypted new encryption key encrypted encryption key in the file header to provide an updated file header; and means for returning the updated file header.

57. A personal key server according to claim 56, wherein the request to update of the file header to incorporate the encryption key encrypted with a new encryption key includes an identification of a user requesting to update the file header, the personal key server further comprising:

means for comparing the identification of the user requesting to update the file header with a list of users authorized to access the file; and means for rejecting the request if the user requesting to update the file header is not identified in the list of users authorized to access the file as the owner of the file.

58. A personal key server according to claim 53, wherein the request from a requester to create a file header associated with the file further contains an unencrypted encryption key associated with users authorized to access the file, the personal key server further comprising:

means for encrypting the unencrypted encryption key with the control key;

means for incorporating the unencrypted encryption key encrypted with the control key in the file header; and means for returning the file header incorporating the encryption key encrypted with the control key.

59. A personal key server according to claim 58, further comprising:

means for receiving a request to recover the encryption key in response to a request by a user other than an owner of the file containing the encryption key encrypted with the control key;

means for decrypting the encryption key encrypted with the control key with the control key; and means for returning the encryption key.

60. A personal key server according to claim 59 wherein the request to recover the encryption key includes an identification of the user requesting to access the file, the personal key server further comprising:

means for comparing the identification of the user requesting to access the file with a list of users authorized to access the file; and means for rejecting the request if the user requesting to access the file is not identified in the list of users authorized to access the file.

61. A personal key server according to claim 53, wherein the request to create a file header associated with the file includes a public key encrypted encryption key corresponding to each user authorized to access the file other than an owner of the file and a list containing each user authorized to have access to the file, the personal key server further comprising:

means for encrypting each public key encrypted encryption key with the control key;

means for incorporating each public key encrypted encryption key encrypted with the control key in the file header; and means for returning the file header incorporating each public key encrypted encryption key encrypted with the control key.

62. A personal key server according to claim 61, further comprising means for creating an access control list from the list provided with the request.

63. A personal key server according to claim 61, further comprising:
- means for receiving a request to recover the public key encrypted encryption key containing the public key encrypted encryption key encrypted with the control key corresponding to a user requesting access to the file;
- means for decrypting the public key encrypted encryption key encrypted the control key with the control key; and
- means for returning the public key encrypted encryption key corresponding to the user requesting the file.

64. A personal key server according to claim 63, further comprising:
- means for comparing the identification of the user requesting to access the file with the list of users authorized to access the file; and
- means for rejecting the request if the user requesting to access the file is not identified in the list of users authorized to access the file.

65. A computer program product for controlling access to digital data of a file utilizing a file system including a personal key client, comprising:
- a computer readable storage media having computer readable program code embodied therein, the computer readable program code comprising:
- computer readable program code that generates an encryption key;
- computer readable program code that encrypts the digital data of the file with the encryption key;
- computer readable program code that obtains a password associated with the file;
- computer readable program code that generates a personal key from the password associated with the file;
- computer readable program code that encrypts the encryption key with the personal key;
- computer readable program code that incorporates in a file header the encryption key encrypted with the personal key;
- computer readable program code that requests encryption of the file header with a control key;
- computer readable program code that receives the file header encrypted with the control key;
- computer readable program code that associates the file header with the file; and
- computer readable program code that stores the file header and the encrypted digital data of the file at a file server.

66. A computer program product for controlling access to digital data of a file in a file system having a personal key server, comprising:
- computer readable program code that receives a request from a requestor to create a file header associated with the file, the request containing an encryption key utilized to encrypt the digital data, the encryption key being encrypted with a personal key;
- computer readable program code that encrypts the encrypted encryption key with a control key to provide the file header containing an encryption key encrypted with both a personal key and a control key; and
- computer readable program code that returns the file header to the requester.

\* \* \* \* \*